United States Patent
Swanson et al.

(10) Patent No.: US 11,927,909 B2
(45) Date of Patent: Mar. 12, 2024

(54) MAGNETIC COUPLING STRUCTURE FOR AN IMAGE FORMING APPARATUS

(71) Applicant: Hewlett-Packard Development Company, L.P., Spring, TX (US)

(72) Inventors: Elizabeth A. Swanson, Boise, ID (US); Gabriel S. McDaniel, Boise, ID (US); Jeffrey H. Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/024,492

(22) PCT Filed: Sep. 28, 2020

(86) PCT No.: PCT/US2020/053067
§ 371 (c)(1),
(2) Date: Mar. 2, 2023

(87) PCT Pub. No.: WO2022/066183
PCT Pub. Date: Mar. 31, 2022

(65) Prior Publication Data
US 2023/0324844 A1    Oct. 12, 2023

(51) Int. Cl.
*G03G 21/16* (2006.01)
*F16D 27/02* (2006.01)
*G03G 21/18* (2006.01)

(52) U.S. Cl.
CPC ......... *G03G 21/1647* (2013.01); *F16D 27/02* (2013.01); *G03G 21/1676* (2013.01); *G03G 21/186* (2013.01); *G03G 2221/1657* (2013.01)

(58) Field of Classification Search
CPC ............. G03G 15/757; G03G 21/1647; G03G 21/1676; G03G 21/1857; G03G 21/186; G03G 2221/1657; F16D 27/02
See application file for complete search history.

(56) References Cited

U.S. PATENT DOCUMENTS

| | | |
|---|---|---|
| 4,905,805 A | 3/1990 | Grimm |
| 5,126,800 A | 6/1992 | Shishido et al. |
| 7,824,162 B2 | 11/2010 | Wilder |
| 8,995,881 B2 | 3/2015 | Kawai |
| 9,026,006 B2 | 5/2015 | Kawai |

(Continued)

FOREIGN PATENT DOCUMENTS

JP    2004-085593 A    3/2004

*Primary Examiner* — Sophia S Chen
(74) *Attorney, Agent, or Firm* — Foley & Lardner LLP

(57) ABSTRACT

An image forming apparatus includes a development cartridge having a developing roller. A coupler for the image forming apparatus includes a shaft and a coupling structure to rotate the developing roller. The coupling structure is disposed at an end part of the shaft, is movable along an axial direction of the shaft and coupleable with another coupling structure of a print engine of the image forming apparatus. The coupling structure includes a body, a magnet disposed in the body to cause the coupling structure to be attracted to the another coupling structure so that the coupling structure is aligned with the another coupling structure, and a plurality of protrusions which protrude from the body in the axial direction to engage with the another coupling structure, the plurality of protrusions having at least one side with an inclined face.

18 Claims, 13 Drawing Sheets

(56) References Cited

U.S. PATENT DOCUMENTS

| | | |
|---|---|---|
| 9,436,156 B1 | 9/2016 | Hattori et al. |
| 11,220,858 B2 * | 1/2022 | Clements ................ F16D 27/02 |
| 2020/0089161 A1 | 3/2020 | Yasui et al. |

* cited by examiner

MAGNETIC COUPLING STRUCTURE FOR AN IMAGE FORMING APPARATUS

CROSS-REFERENCE TO RELATED APPLICATIONS

This application is filed under 35 U.S.C. § 371 as a National Stage of PCT International Application No. PCT/US2020/053067, filed Sep. 28, 2020, the entirety of which is incorporated by reference herein.

BACKGROUND

An image forming apparatus forms an image on a recording medium, for example, in an electrophotographic manner. An image forming apparatus using the electrophotographic method supplies toner to an electrostatic latent image formed on a photoconductor to form a visible toner image on the photoconductor, transfers the toner image to the recording medium via an intermediate transfer medium or directly to a recording medium, and then fixes the transferred toner image on the recording medium.

A development system may include a development cartridge capable of being detachably attached to the image forming apparatus. The development cartridge may include an assembly of elements including a photoconductor and a developing roller for forming the visible toner image. The development cartridge may be detachably attached to a main body of the image forming apparatus and be a consumable item that is replaced when its service life is over. In a development cartridge using a contact development method, a developing roller and a photoconductor contact each other, thereby forming a development nip.

DETAILED DESCRIPTION

Figure 1:
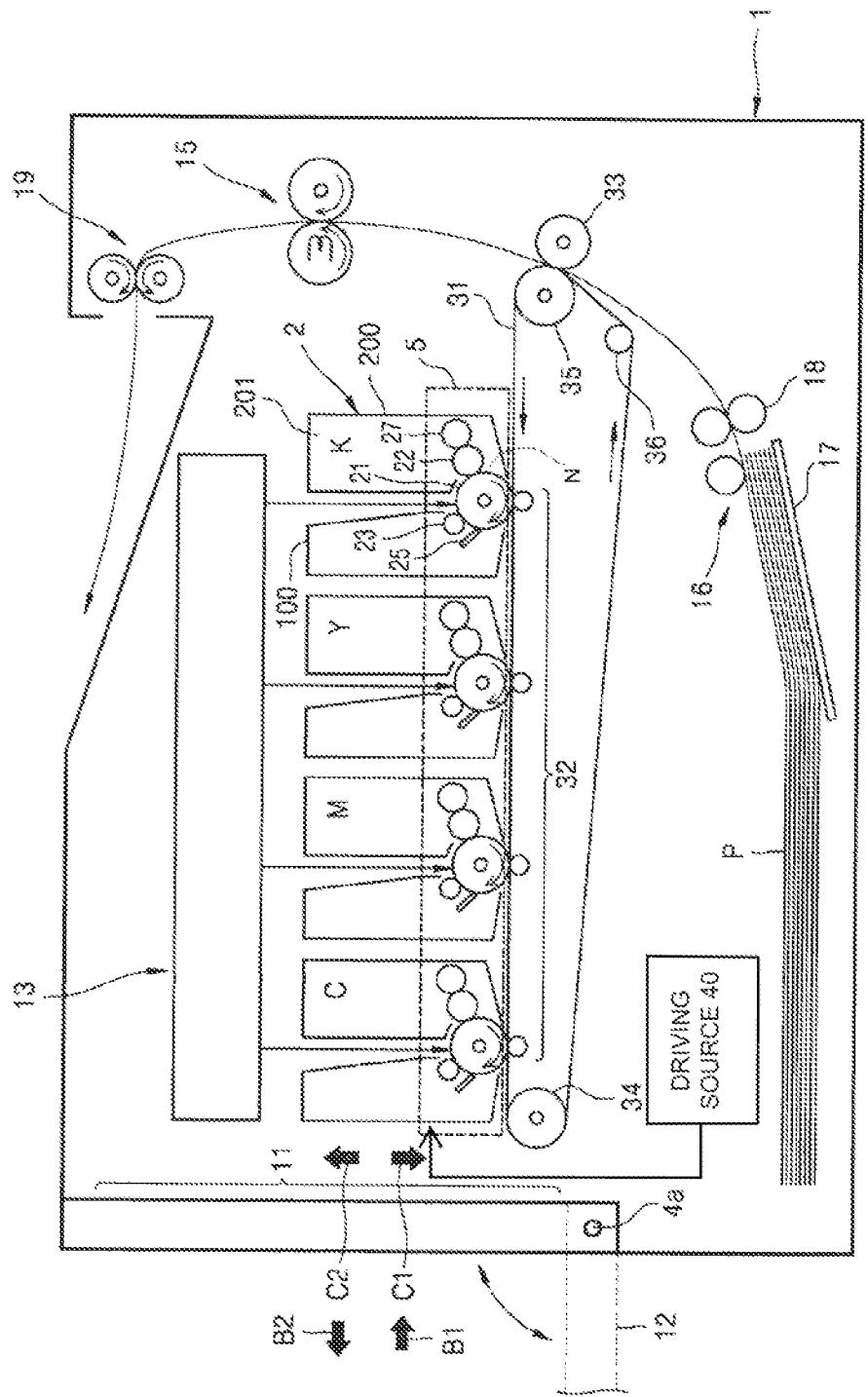
FIG. 1 is a schematic configuration diagram illustrating an image forming apparatus according to an example of the disclosure.

Hereinafter, examples of an electrophotographic image forming apparatus and a development system having a development cartridge will be described in detail with reference to the accompanying drawings. Elements having substantially the same configurations are denoted by the same reference numerals in the specification and the accompanying drawings, and thus, a repeated description thereof is omitted.

According to the disclosure, a development system (development cartridge) includes a photosensitive unit including a photosensitive drum, and a developing unit including a developing roller. The developing unit may be coupled to the photosensitive unit such that the developing unit is movable to a development position where a development nip forms by contact between the developing roller and the photosensitive drum and is movable to a release position where the development nip is released.

According to the disclosure, the developing roller includes a roller body, a shaft to pass through a central axis of the roller body, and a coupling structure, disposed on an end of the shaft, movable along an axial direction of the shaft and coupleable with another coupling structure of a print engine of the image forming apparatus. The coupling structure includes a body, a magnet disposed in the body to cause the coupling structure to be attracted to the another coupling structure of the print engine so that the coupling structure is aligned with the another coupling structure, and a plurality of protrusions which protrude from the body in an axial direction to engage with the another coupling structure. The plurality of protrusions may have at least one side with an inclined face.

In some development cartridges, for example an all-in-one development cartridge which includes a developing roller, photoconductor, and toner, there are applications where the developing roller may be positioned in one of two states: an alienated state and a non-alienated state. The alienated state of the development roller may be a state in which the developing roller is spaced apart from the photoconductor. The non-alienated state of the development roller may be a state in which the developing roller is brought into contact with the photoconductor.

Applications in which the developing roller may be positioned in the alienated state include when an image forming operation, such as a printing operation, is not performed. For example, the developing roller may be positioned in the alienated state so that the developing roller is not rotated even though the photoconductor or another component may be rotated. Thus, placing a developing roller in the alienated state may reduce wear and extend the life of the developing roller, minimize the impact on the environment through waste reduction, provide power savings, and increase customer satisfaction. Applications in which the developing roller may be placed in the non-alienated state include when an image forming operation, for example a printing operation, is to be performed.

Whether the developing roller is placed in the alienated or non-alienated state may be controlled by the image forming apparatus, for example by a controller of the image forming apparatus. For example, the controller of the image forming apparatus may transmit a drive signal to a driving source to cause the developing roller to be rotated or translated based on mechanical movements imposed on the developing roller and/or the photoconductor.

The alienation movements imparted by the image forming apparatus to the development cartridge can cause power transmitting issues where a shaft of the developing roller that is to be aligned with a coupling structure of the print engine in the non-alienated state is misaligned.

The example coupling structures described herein can maintain reliable power transmission in a coaxial drive state, and allow the coupling to separate when in the non-coaxial state and re-engage automatically when switching back to the coaxial state.

Couplings may be used to create a joint that can transfer power or torque between shafts. Clutches may function as a coupling which may be engaged or disengaged based on a mechanical input. The example coupling structures described herein may include a magnetic coupling that may be used to communicate torque or power across a joint and may act as a fixed coupling or as a torque limiting clutch. The magnetic coupling structure may be used to axially align shafts which may be misaligned when joining coupling structures together, including a condition where the shafts come into contact with each other from a non-parallel or non-coaxially located orientation. For example, the magnetic force of the magnetic coupling structure may be used to self-orient the coupling structures. For example, the magnetic coupling structure may also be configured or shaped so that the coupling structures can disengage from one another when an excessive force is applied.

For example, the magnetic coupling structures described herein allow a developing roller of a development cartridge to be properly installed in the image forming apparatus by aligning the magnetic coupling structure of the developing roller to the coupling structure of the print engine upon insertion. For example, a rotatable shaft of the developing roller may include the magnetic coupling structure and may be used to transmit power in both coaxial and non-coaxial configurations. The proper alignment of the magnetic coupling structure of the developing roller may be achieved by intrinsic features incorporated into the magnetic coupling structure which include a magnetic attraction between the magnetic coupling structure and the coupling structure of the print engine so that the developing roller is properly aligned when inserted and mounted into the image forming apparatus.

As described above a development cartridge may be configured to pivot between two positions during operation. This changes the position of the cartridge rollers and a mechanism may be used to maintain coupling when the printer drive and the cartridge rollers are not aligned.

For example, a mechanism may include an urging (elastic) member or spring to urge the coupling structure in a specified direction. However, in examples described herein, an urging (elastic) member or spring may not be used or needed to maintain a position or alignment of the coupling structure.

According to the disclosure, an image forming apparatus may include a main body, and a development cartridge having the developing roller with a coupling structure. The development cartridge may be installable to the main body and detachable from the main body.

FIG. 1 is a schematic configuration diagram illustrating an electrophotographic image forming apparatus, according to an example. An image forming apparatus according to the example prints a color image to a recording medium P in an electrophotographic manner. Referring to FIG. 1, the image forming apparatus may include a main body 1, a plurality of development cartridges 2, an exposure device 13, a transfer device, and a fuser 15.

For color printing, the plurality of development cartridges 2 may include four development cartridges 2 for developing images with cyan color, magenta color, yellow color, and black color, respectively. Toners, of cyan (C) color, magenta (M) color, yellow (Y) color, and black (K) color may be contained in the four development cartridges 2, respectively. Although not illustrated, the toners of cyan color, magenta color, yellow color, and black color may be respectively contained in four toner supply containers, and may be respectively supplied from the four toner supply containers to the four development cartridges 2. The image forming apparatus may further include development cartridges 2 for containing and developing toners of other various colors such as light magenta color and white color. Hereinafter, unless there is a description contrary thereto, items with reference characters C, M, Y, and K indicate elements for developing images with cyan color, magenta color, yellow color, and black color, respectively.

The main body 1 includes an opening 11 that provides a path for mounting/detaching the plurality of development cartridges 2. A cover or door 12 opens and closes the opening 11. The cover or door 12 may rotate about a hinge 4a, for example, to open and close the opening 11. The opening may be located on a side of the main body 1, for example, a front, rear, left, or right side. The exposure device 13, the transfer device, and the fuser 15 are arranged at the main body 1. In addition, a recording medium transport unit for loading and transporting the recording medium P where an image is to be formed is arranged at the main body 1.

In the example, each of the plurality of development cartridges 2 is an integrated development cartridge. Each development cartridge 2 may include a photosensitive unit 100 and a developing unit 200.

The photosensitive unit 100 includes a photosensitive drum 21. The photosensitive drum 21. The photosensitive drum 21, as a photoconductor or organic photoconductor on which an electrostatic latent image is formed, may include a conductive metal pipe and a photosensitive layer formed at an outer circumference of the conductive metal pipe. A charging roller 23 is an example of a charger that charges a surface of the photosensitive drum 21 to have a uniform surface potential. Instead of the charging roller 23, a charging brush, a corona charger, or the like may be used. The photosensitive unit 100 may further include a cleaning roller for removing foreign substances attached to a surface of the charging roller 23. A cleaning blade 25 is an example of a cleaning member that removes residual toners and foreign substances attached to the surface of the photosensitive drum 21 after a transfer process described below. Instead of the cleaning blade 25, a cleaning device in another form, such as a rotating brush, may be used.

The developing unit 200 includes a toner container 201. The developing unit 200 supplies a toner in the toner container 201 to an electrostatic latent image formed on the photosensitive drum 21, thereby developing the electrostatic latent image into a visible toner image. A developing method may include a one-component developing method using a toner and a two-component developing method using a toner and a carrier. In an example, the developing unit 200 employs the one-component developing method. A developing roller 22 supplies a printing material, for example toner, to the photosensitive drum 21. A developing bias voltage may be applied to the developing roller 22 to supply the toner to the photosensitive drum 21.

The one-component developing method may be classified into a contact development technique in which the developing roller 22 and the photosensitive drum 21 rotate while contacting each other and a non-contact development technique in which the developing roller 22 and the photosensitive drum 21 rotate while being separate from each other by tens to hundreds of microns. In an example, a contact development technique in which the developing roller 22 and the photosensitive drum 21 contact each other and thus form a development nip N is used. A supply roller 27 supplies the toner in the toner container 201 to a surface of the developing roller 22. To this end, a supply bias voltage may be applied to the supply roller 27. The developing unit 20 may further include a regulating member (not shown) for regulating an amount of toner to be supplied by the developing roller 22 to the development nip N where the photosensitive drum 21 and the developing roller 22 contact each other. For example, the regulating member may be a doctor blade that elastically contacts the surface of the developing roller 22.

The exposure device 13 radiates light modulated in correspondence with image information onto the photosensitive drum 21 and thus forms the electrostatic latent image on the photosensitive drum 21. Examples of the exposure device 13 may include a laser scanning unit (LSU) using a laser diode as a light source and a light-emitting diode (LED) exposure device using an LED as a light source.

The transfer device may include an intermediate transfer belt 31, first transfer rollers 32, and a second transfer roller 33. The intermediate transfer belt 31 temporarily receives a toner image developed on the photosensitive drum 21 of each of the development cartridges 2C, 2M, 2Y, and 2K. The intermediate transfer belt 31 is circulated while being supported by supporting rollers 34, 35, and 36. Four first transfer rollers 32 are positioned to face the photosensitive drums 21 of the development cartridges 2C, 2M, 2Y, and 2K with the intermediate transfer belt 31 therebetween. A first transfer bias voltage is applied to the four first transfer rollers 32 to firstly transfer toner images, which are developed on the photosensitive drums 21, to the intermediate transfer belt 31. Instead of the first transfer rollers 32, a corona transfer device or a pin scorotron-type transfer device may be used. The second transfer roller 33 is positioned to face the intermediate transfer belt 31. A second transfer bias voltage is applied to the second transfer roller 33 to transfer, to the recording medium P, the toner images that are firstly-transferred to the intermediate transfer belt 31.

When a print command is transmitted from a host (not shown), or is input at the image forming apparatus, for example, a controller of the image forming apparatus charges, by using the charging roller 23, the surface of the photosensitive drum 21 to have a uniform surface potential. The exposure device 13 forms electrostatic latent images on the photosensitive drums 21 by scanning light beams to the photosensitive drums 21 of the development cartridges 2C, 2M, 2Y, and 2K, the light beams being modulated according to image information corresponding to cyan, magenta, yellow, and black colors, respectively. The developing rollers 22 of the development cartridges 2C, 2M, 2Y, and 2K supply C, M, Y, and K toners to the photosensitive drums 21, respectively, thereby developing the electrostatic latent images into visible toner images. The developed toner images are firstly transferred to the intermediate transfer belt 31. Recording media P loaded on a loading plate 17 are output one by one by a pick-up roller 16, and are transported to a transfer nip by a feed roller 18, the transfer nip being formed by the second transfer roller 33 and the intermediate transfer belt 31. The toner images that are firstly-transferred to the intermediate transfer belt 31 are secondly transferred to the recording medium P due to the second transfer bias voltage applied to the second transfer roller 33. When the recording medium P passes through the fuser 15, the toner images are fixed on the recording medium P due to heat and pressure. The recording medium P on which fixing has been completed is externally discharged by a discharge roller 19.

The development cartridges 2C, 2M, 2Y, and 2K may be sequentially detachably attached to the main body 1 through the opening 11 opened by the door or cover 12. That is, the plurality of development cartridges 2 may be mounted on the main body 1 by opening the door 12 and causing the development cartridges 2 to slide in a mounting direction B1. Also, the development cartridges 2 may be detached from the main body 1 by opening the door 12 and causing the development cartridges 2 to slide in a removal direction B2.

The development cartridges 2C, 2M, 2Y, and 2K may be mounted on the main body 1 in a tray manner. The main body 1 includes a tray 5 which is loaded with the development cartridges 2C, 2M, 2Y, and 2K which can be inserted into the main body 1 and retracted from the main body 1. For example, after the door 12 is opened, and the tray 5 is brought out of the main body 1 by causing the tray 5 to slide in the removal direction B2, the development cartridges 2C, 2M, 2Y, and 2K may be loaded on the tray 5. Next, the tray 5 may be inserted into the main body 1 by causing the tray 5 to slide in the mounting direction B1, and the door 12 may be closed. When the tray 5 is inserted into the main body 1, and the door 12 is closed, the tray 5 may be moved in a descending direction C1 by a closing operation of the door 12. When the door 12 is opened, the tray 5 may be moved in an ascending direction C2.

Rotational members of the development cartridge 2, for example, the photoconductive drum 21, the developing roller 22, and the supply roller 27, may be driven by being connected to a driving source 40 arranged at the main body 1 when the development cartridge 2 is mounted or installed to the main body 1.

The driving source 40 may be coupled directly or indirectly to a rotatable shaft to rotate a body, for example a roller of the image forming apparatus. The driving source 40 may include a motor, a solenoid, another electromechanical device, or combinations thereof. For example, the driving source 40 may include a motor, a gear coupled to a rotatable shaft, and a driving belt coupling the motor to the gear to drive rotation of the rotatable shaft according to a signal output from the controller. The rotatable shaft may be rotated in a first direction and a second direction by the driving source 40. The first direction may be referred to as a "forward" direction and the second direction may be referred to as a "reverse" direction. A driving source may drive more than one body. For example, a single driving source may cause more than one body to move or rotate. For example, the driving source 40 may drive all of the four development cartridges 2, or four driving sources 40 may be respectively arranged with respect to the four development cartridges 2.

Figure 2A:
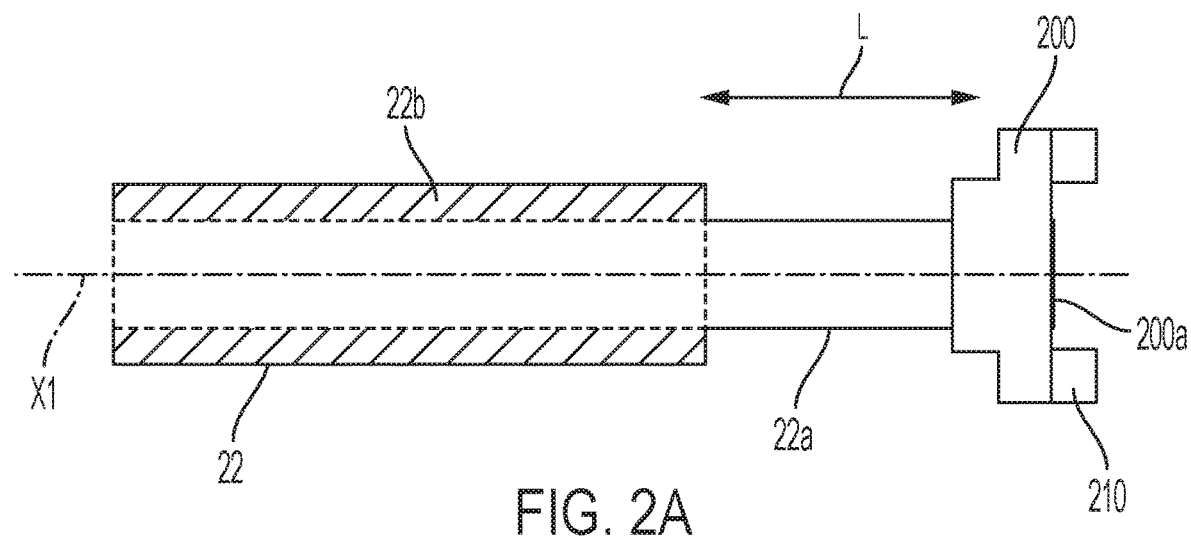
FIGS. 2A and 2B illustrate an example coupling structure for a developing roller of an image forming apparatus in a side view and cross-section view, respectively, according to an example of the disclosure.
Figure 2B:
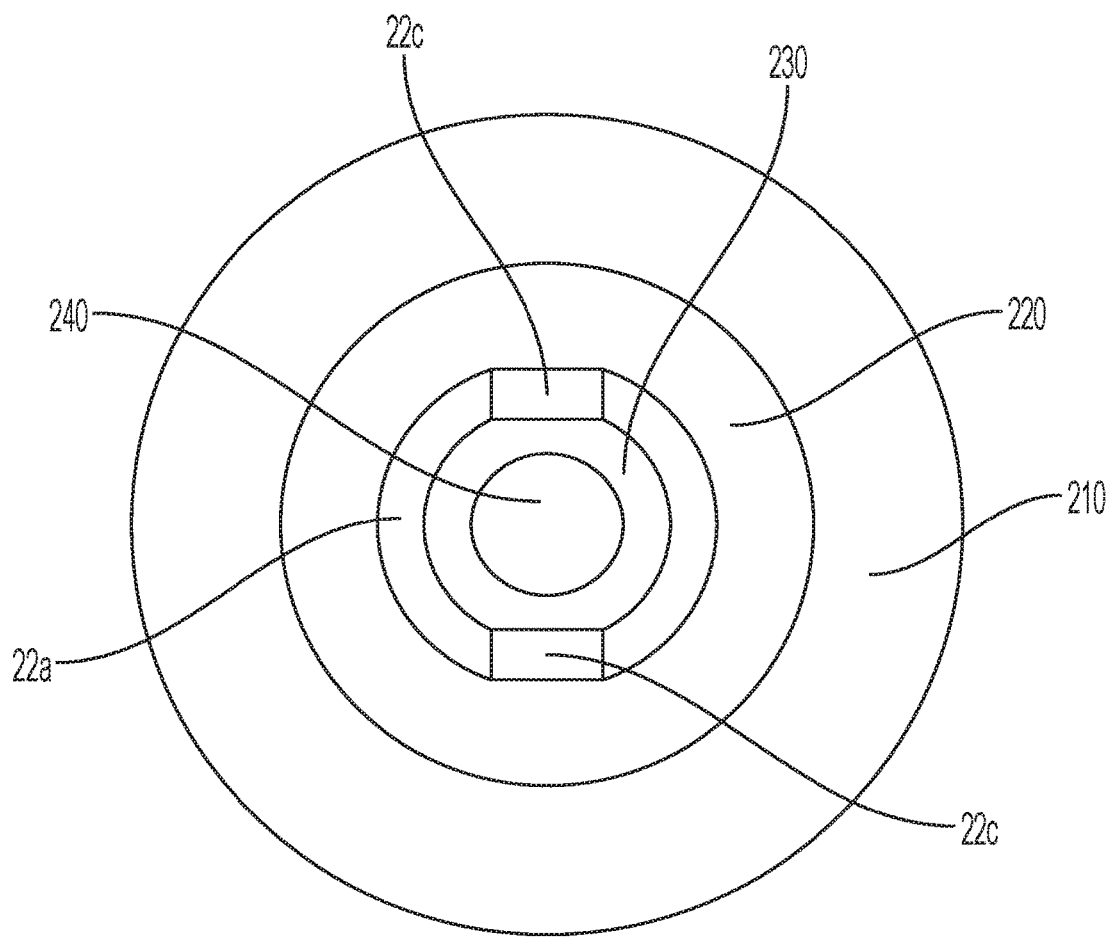

Referring to FIGS. 2A and 2B, an example coupling structure for a developing roller (first coupler) of an image forming apparatus is illustrated in a side view and cross-section view, respectively, according to an example of the disclosure.

In the example, the developing roller 22 includes a shaft 22*a* which passes through the roller body 22*b*, for example, a central axis X1 of the roller body 22*b*. The developing roller 22 may extend in an axial or longitudinal direction L and rotate about the rotational axis X1. The shaft 22*a* may protrude outward from the roller body 22*b* in the longitudinal direction.

A coupling structure 200, disposed at an end part of the shaft 22*a*, is connectable or coupleable to another coupling structure of a print engine drive system (to be described later) which rotates the developing roller 22, for example, during a printing operation. For example, the print engine may include various components for moving and controlling the movement of the recording medium along an image forming path and supply components for forming an image on the recording medium.

An interlocking drive element or member 210 (for example, a drive tooth), which protrudes outward in the axial direction L, is disposed at an outer ring 220 of the coupling structure 200. The interlocking drive element 210 interlocks with a corresponding interlocking drive element or member of the coupling structure of the print engine which has a complementary shape with respect to the interlocking drive element 210. The interlocking element 210 may be disposed at various locations of the outer ring 220, for example, at three circumferentially spaced apart locations. However, the number of interlocking elements 210 disposed at the outer ring 220 may be more than three or less than three and is not limited to the example.

As illustrated in FIG. 2B, the coupling structure 200 may include concentric rings or portions including the outer ring 220 and an inner ring 230. The outer ring 220 may be shaped to have a size which fits around the outer circumferential surface of the shaft 22*a*, and inner ring 230 may be shaped to have a size which fits inside an inner hollow portion of the shaft 22*a*. The coupling structure 200 may be movable or slidable in the axial direction L. An amount or distance by which the coupling structure 200 is translatable along the axial direction L may be limited by an axial distance limiter 22*c*. For example, two axial distance limiters 22*c* may be disposed on shaft 22*a* which are disposed diametrically apart. However, the number of axial distance limiters 22*c* disposed at the shaft 22*a* may be more than two or less than two and is not limited to the example.

A magnet 240 may be disposed in a central portion of a body 200*a* of the coupling structure 200. The magnet 240 may be centered in the body 200*a*, however the magnet 240 need not necessarily be centered. The magnet 240 may be circular in shape and may be disposed to be inset in the inner ring 230 such that the magnet 240 is flush with a surface 230*a* of the inner ring 230 that faces away from the end of the shaft 22*a*. As other examples, the magnet 240 may be inset in the inner ring 230 such that magnet 240 is recessed with respect to surface 230*a*, or the magnet 240 may protrude outward from the inner ring 230 such that magnet 240 extends outward with respect to surface 230*a*. Magnet 240 may also be mounted in a counterbore from a back side of the body 200*a* of the coupling structure 200 such that the magnet 240 is just under the surface 230*a*, but still exerts a sufficient magnetic force to hold the coupling together between coupling structure 200 and the another coupling structure of the print engine.

Surface 230*a* may be perpendicular to the axial direction and face away from the end part of shaft 22*a*. The magnet 240 may cause the coupling structure 200 to be attracted to the another coupling structure to align the coupling structure 200 with the another coupling structure of the print engine. For example, the magnet 240 may be disposed in the body 200*a* to cause the coupling structure 200 to move along an axial direction of the shaft 22*a* when the developing roller 22 is moved from the alienated state to the non-alienated state to align the coupling structure 200 with another coupling structure of a print engine of the image forming apparatus. For example, the magnet 240 (first magnet) and the magnet of the another coupling structure (second magnet) may be magnetically attractable with one another to cause the shaft 22*a* (first shaft) to be aligned with the shaft (second shaft) to which the another coupling structure is coupled to.

Figure 3:
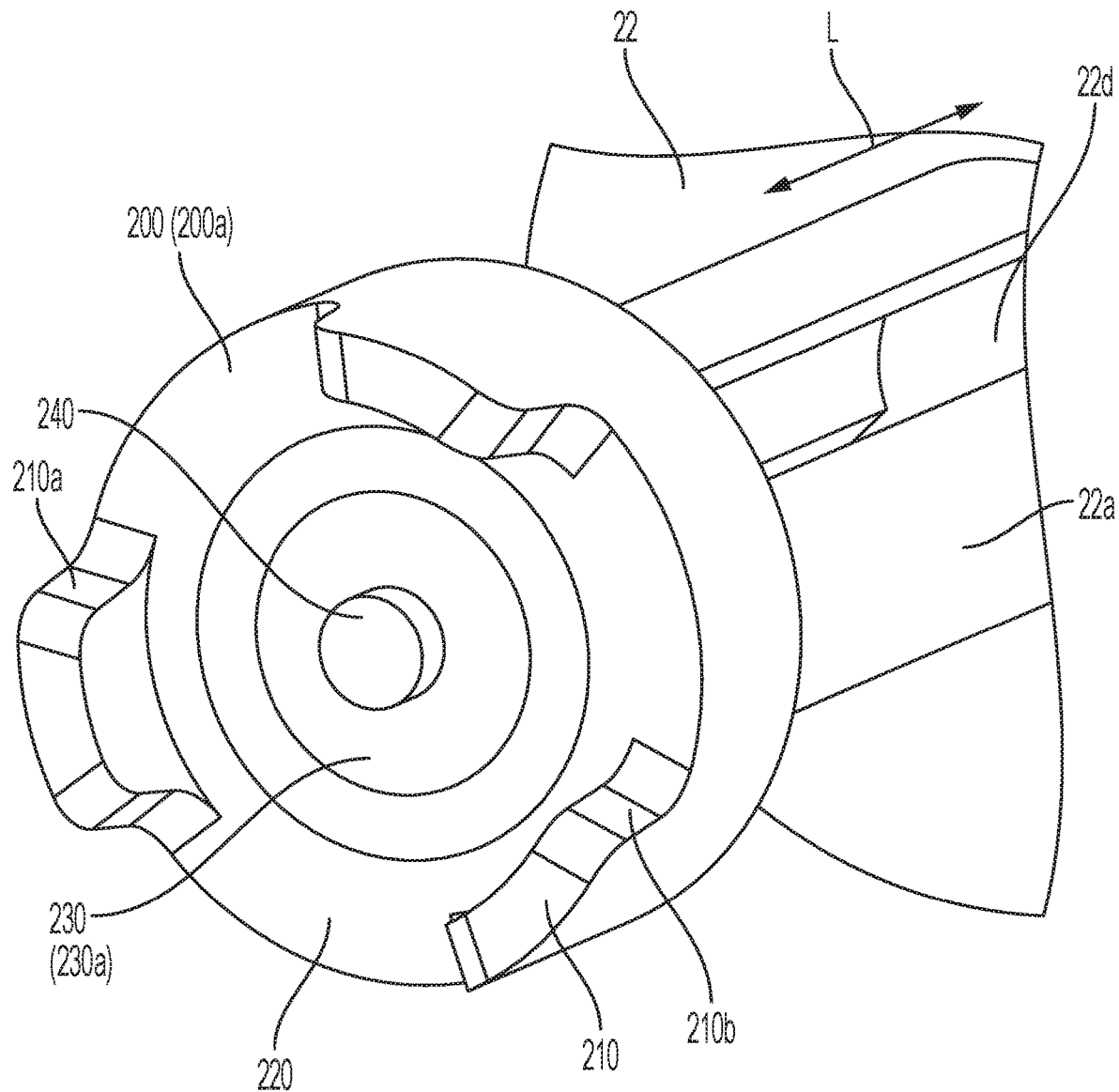
FIG. 3 is an example coupling structure for a developing roller of an image forming apparatus in a perspective view, according to an example of the disclosure.

Referring now to FIG. 3, an example coupling structure for a developing roller of an image forming apparatus is illustrated in a perspective view, according to an example of the disclosure.

In FIG. 3, similar to the coupling structure 200 shown in FIGS. 2A-2B, body 200*a* of the coupling structure 200 may include an outer and inner portion, for example concentric rings including the outer ring 220 and an inner ring 230. The outer portion may circumferentially surround an outer surface of shaft 22*a* and the inner portion may be circumferentially surrounded by an inner surface of the shaft 22*a*. The coupling structure 200 may be movable or slidable in the axial direction L along slots 22*d* which are formed in shaft 22*a*. The coupling structure 200 may be movable or slidable in the axial direction L by other methods, for example by use of a shaft and collar, for example. An amount or distance by which the coupling structure 200 is translatable along the axial direction L may be limited by an axial distance limiter (not shown in FIG. 3).

In FIG. 3, interlocking drive elements or members 210 (for example, a drive tooth), protrude outward in the axial direction L from the body 200*a*, and are disposed at the outer ring 220 of the coupling structure 200. The interlocking drive elements 210 illustrated in FIG. 3 have rounded sides rather than vertical or perpendicular sides. On one side, the interlocking drive elements 210 have an inner side face 210*a* which is inclined and faces in a first circumferential direction. On another side, the interlocking drive elements 210 have an inner side face 210*b* which is also inclined and faces in a second circumferential direction. The interlocking drive elements 210 (first plurality of protrusions) may interlock with a corresponding interlocking drive element or member of the coupling structure of the print engine having a complementary shape with respect to the corresponding interlocking drive element 210. The angle of the inclined side faces 210*a*, 210*b* may be referred to as a pressure angle. For example, the pressure angle may be set to 45 degrees. For example, the pressure angle may be in a range of 20 to 70 degrees. However, the disclosure is not so limited and the pressure angle may be a value other than these examples.

The developing roller 22 may be driven to rotate when the interlocking drive elements 210 are interlocked with interlocking drive elements of the coupling structure of the print engine and the interlocking drive elements of the coupling structure of the print engine are rotated, for example, by a driving force generated by the driving source 40. When an over-torque condition is encountered, for example, due to an excessive force applied in a circumferential direction, the pressure angle may allow for or permit the interlocking drive elements 210 to disengage from the interlocking drive elements of the coupling structure of the print engine. That is, the pressure angle force may be greater than a magnetic force of the coupling structures. In contrast, when the sides of the interlocking drive elements of the coupling structure are perpendicular with respect to the surface 230*a*, disengagement may not be possible and damage may occur to the developing roller, driving source, print engine, or other components of the image forming apparatus when an over-torque condition or side load is encountered. For example, an over-torque condition or side load may be encountered due to an excessive force being applied in the circumferential direction or due to a translational force (side load) which is applied in a direction perpendicular to the coupling between coupling structures of the developing roller and print engine.

In FIG. 3, the magnet 240 is disposed in a central portion of the coupling structure 200 and protrudes outward from the inner ring 230 such that magnet 240 extends outward with respect to surface 230a. The magnet 240 may be incorporated into the coupling structure 200 and have intrinsic properties such that an attraction may be formed between the coupling structure 200 and a coupling structure of the print engine.

Figure 4A:
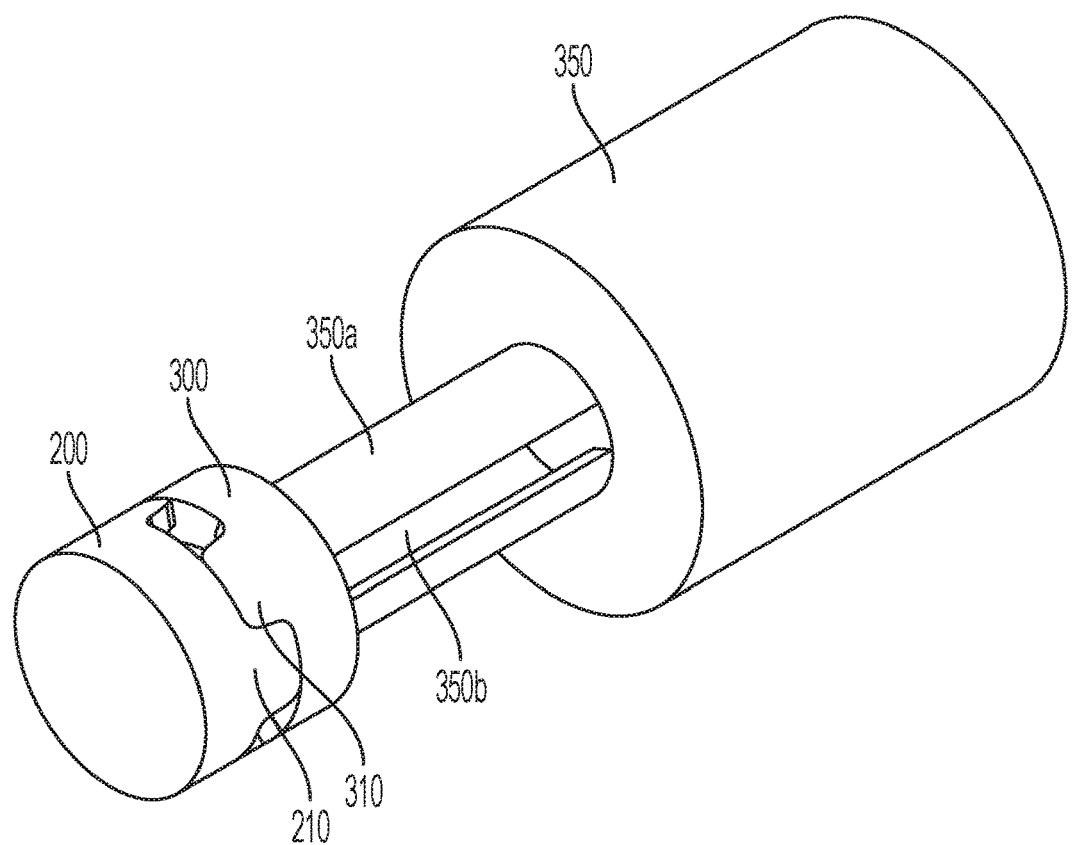
FIGS. 4A and 4B are example illustrations of a coupling between coupling structures of the developing roller and print engine, in perspective and side views, respectively, according to an example of the disclosure.
Figure 4B:
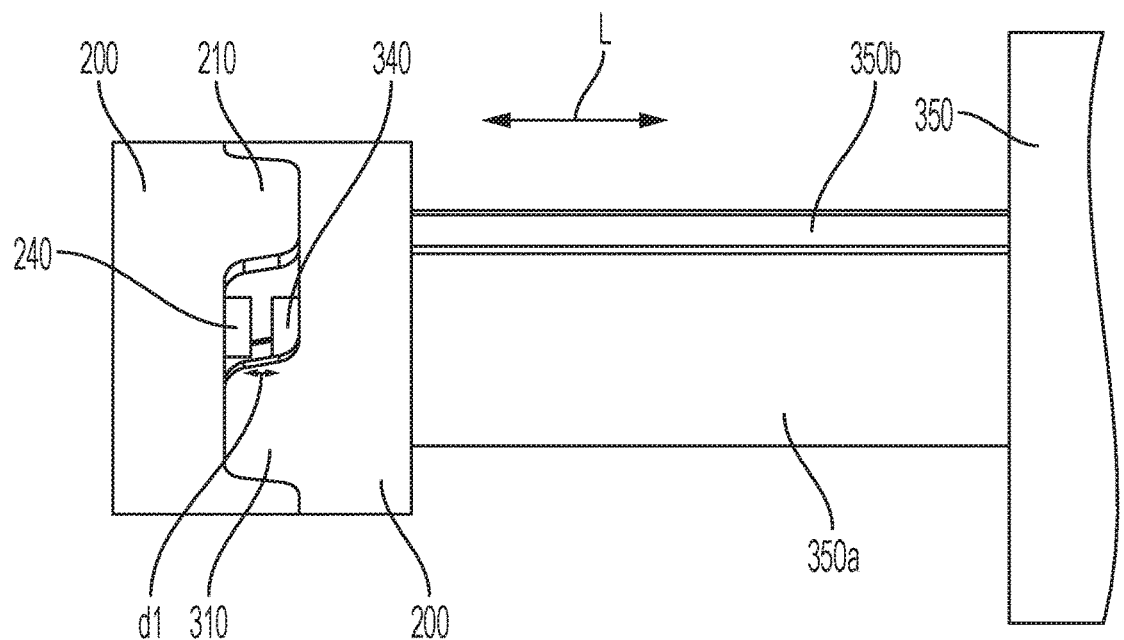

Referring to FIGS. 4A-4B, an example joining or connection between coupling structures of the developing roller and print engine are illustrated in perspective and side views, respectively, according to an example of the disclosure.

In the example, the print engine includes a coupler or drive 350 (second coupler) including a shaft 350a (second shaft) which protrudes from the coupler 350. For example, the coupler 350 may be fixed to the image forming apparatus, for example to an internal frame of the image forming apparatus. The coupler 350 and shaft 350a may extend in an axial or longitudinal direction L and rotate about the rotational axis X1 when axially joined with coupling structure 200 of the developing roller 22 which is not shown in FIGS. 4A-4B for ease of illustration. The shaft 350a may protrude outward from the coupler 350 in the longitudinal direction and may include a slot 350b similar to slot 22d of shaft 22a. The coupling structure 300 may be movable or slidable in the axial direction L by methods other than use of a slot, for example by use of a shaft and collar, for example.

A coupling structure 300 (second coupling structure), disposed at an end of the shaft 350a, is connectable or coupleable to the coupling structure 200 of the developing roller 22. The coupler 350 may be driven directly or indirectly by driving source 40 to rotate the developing roller 22 via the connection of the coupling structures 200, 300. An interlocking drive element or member 310 (for example, a drive tooth), which protrudes outward in the axial direction L, is disposed at an outer ring 320 (see FIG. 5A) of the coupling structure 300. The interlocking drive element 310 interlocks with a corresponding interlocking drive element 210 of the coupling structure 200 which has a complementary shape with respect to the interlocking drive element 310. The interlocking drive elements 310 (second plurality of protrusions) may be disposed at various locations of the outer ring 320, for example, at three circumferentially spaced apart locations. However, the number of interlocking drive elements 310 disposed at the outer ring 320 may be more than three or less than three and is not limited to the example.

Similar to the coupling structure 200 of the developing roller, the coupling structure 300 of the print engine may include a magnet 340 so that a magnetic attraction occurs between the coupling structure 200 and the coupling structure 300 of the print engine so that the developing roller 22 is properly aligned with the coupler 350 of the print engine, for example when the developing roller 22 is inserted into the image forming apparatus, or when the developing roller 22 is moved from an alienated state back to a non-alienated state. As another example, the magnet 340 may instead be a ferromagnetic material which is attracted to magnet 240.

Figure 5:
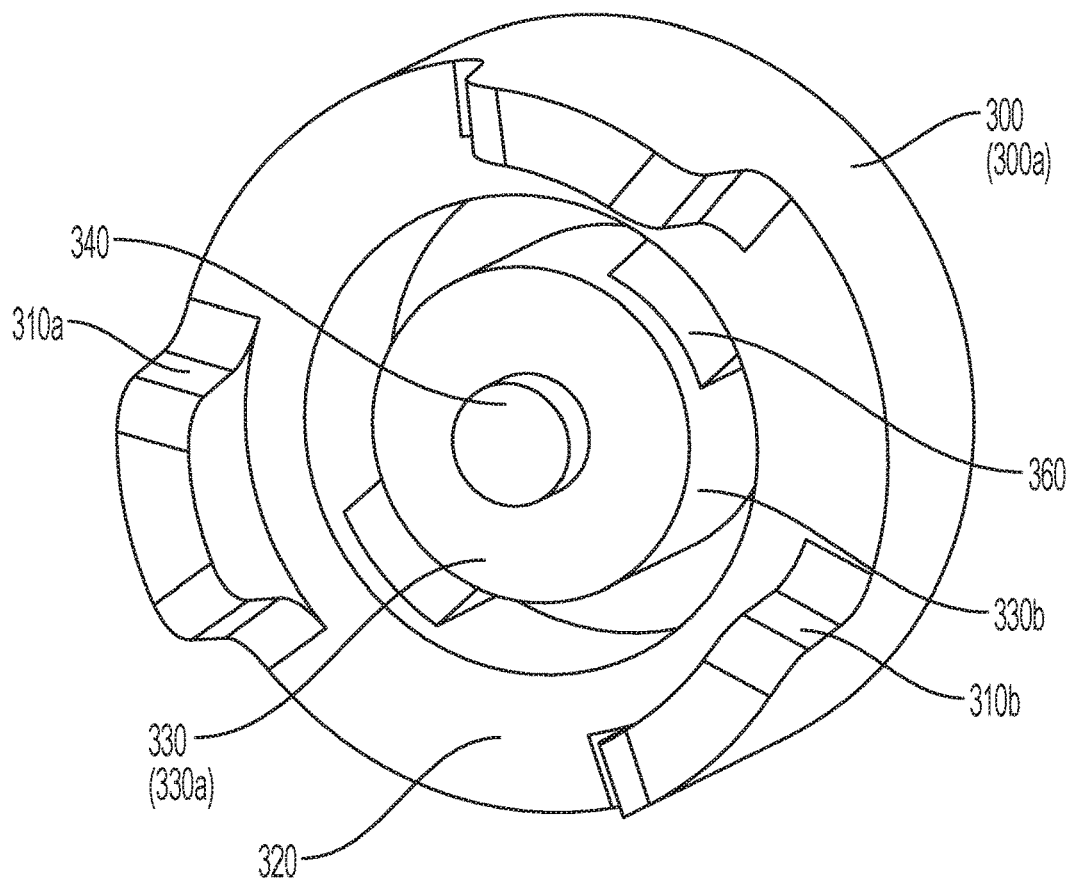
FIGS. 5 through 7 are example illustrations of a coupling structure and shaft of a print engine, according to examples of the disclosure.
Figure 6:
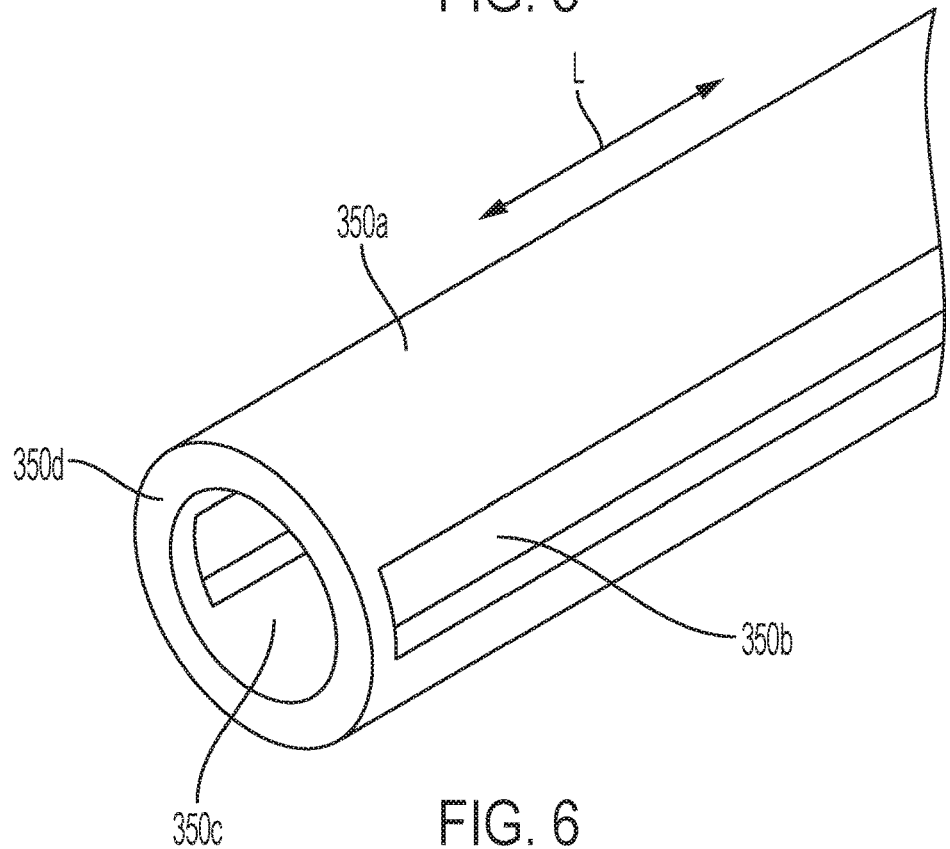
Figure 7:
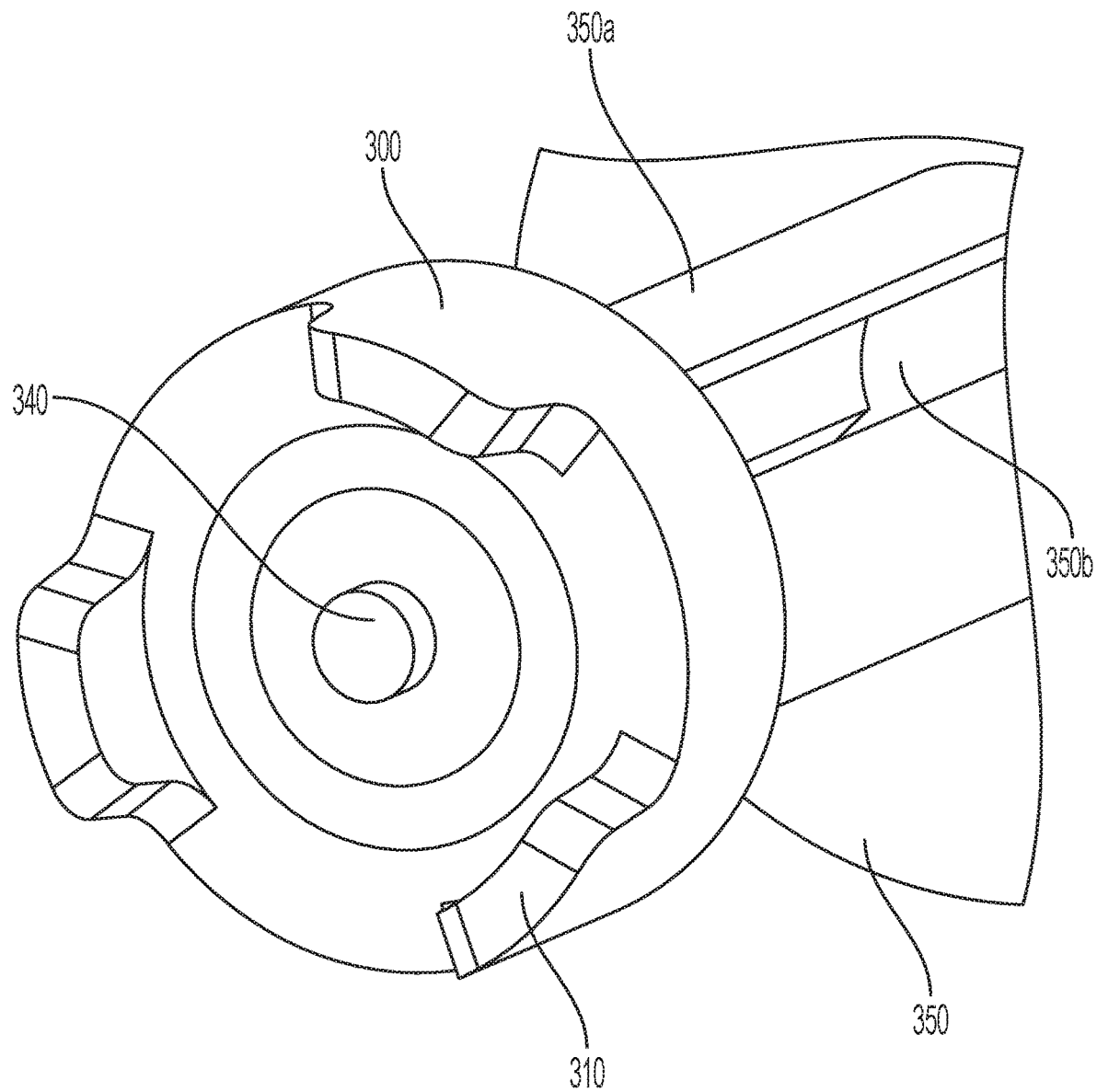

Referring to FIGS. 5 through 7, an example coupling structure and shaft of the print engine are illustrated in perspective views, according to an example of the disclosure.

With reference to FIGS. 5 through 7, a body 300a (second body) of the coupling structure 300 may include concentric rings or inner and outer portions including the outer ring 320 and an inner ring 330. The outer ring 320 may be shaped to have a size which fits around the outer circumferential surface of the shaft 350a, and inner ring 330 may be shaped to have a size which fits inside an inner hollow portion 350c of the shaft 350a. The coupling structure 300 may be movable or slidable in the axial direction L, for example, according to a magnetic attraction between the coupling structure 200 and the another coupling structure 300. An amount or distance by which the coupling structure 300 is translatable along the axial direction L may be limited by an axial distance limiter (not shown) similar to that described above with respect to coupling structure 200.

The magnet 340 may be disposed in a central portion of the body 300a of the coupling structure 300. The magnet 340 may be centered in the body 300a, however the magnet 340 need not necessarily be centered. The magnet 340 may be circular in shape and may be disposed to be inset in the inner ring 330 such that the magnet 340 is flush with a surface 330a of the inner ring 330 that faces away from the end 350d of the shaft 350a. Surface 330a may be perpendicular to the axial direction and face away from the end part of shaft 350a. As other examples, the magnet 340 may be inset in the inner ring 330 such that magnet 340 is recessed with respect to surface 330a, or the magnet 340 may protrude outward from the inner ring 330 such that magnet 340 extends outward with respect to surface 330a. Magnet 340 may also be mounted in a counterbore from a back side of the body 300a of the coupling structure 300 such that the magnet 340 is just under the surface 330a, but still exerts a sufficient magnetic force to hold the coupling together between coupling structures 200, 300.

In FIG. 5, interlocking drive elements or members 310 (for example, a drive tooth), protrude outward in the axial direction L, and are disposed at the outer ring 320 of the coupling structure 300. The interlocking drive elements 310 illustrated in FIG. 5 have rounded sides rather than vertical sides. On one side, the interlocking drive elements 310 have an inner side face 310a which is inclined and faces in a first circumferential direction. On another side, the interlocking drive elements 310 have an inner side face 310b which is also inclined and faces in a second circumferential direction. The interlocking drive elements 310 may interlock with a corresponding interlocking drive element 210 of the coupling structure 200, for example as shown in FIGS. 4A-4B. The angle of the inclined side faces 310a, 310b may be referred to as a pressure angle. For example, the pressure angle may be set to 45 degrees. However, the disclosure is not so limited and the pressure angle may be in the range of 20 to 70 degrees, for example.

As discussed above, the pressure angle of the interlocking drive element 310 may be configured so that when an over-torque condition or side load is encountered such that the pressure angle force exceeds a magnetic force between the coupling structures 200, 300, disengagement between the coupling structures 200, 300 occurs and damage to the developing roller, driving source, print engine, or other components of the image forming apparatus is prevented, limited, or avoided.

In FIG. 5, a wing portion 360 connects the inner ring 330 to the outer ring 320 and extends radially from the inner ring 330 in an outward radial direction. As shown in FIG. 5, two wing portions 360 extend from inner ring 330 are disposed diametrically opposite of one another. The coupling structure 300 may include more than two wing portions 360. The wing portions 360 are shaped to fit inside of slots 350b which are disposed in shaft 350a such that the coupling structure 300 may be slidable along the slots 350b in the axial direction L and independent rotation of the coupling structure 300 may be constrained. A keyed shaft, spline, or other feature may also be employed such that translation on the shaft 350a is allowed but rotation is constrained. The number of slots 350b may correspond to the number of wing portions 360, for example. The coupling structure 300 may be mounted to the shaft 350a before shaft 350a is mounted to coupler 350, by inserting the inner ring 330 into the hollow portion 350c of shaft 350a at an end of the shaft 350a which is opposite to end 350d, and then sliding the coupling structure 300 along slots 350b to the end 350d of shaft 350a. The inner ring 330 may be a solid cylindrical portion having the magnet 340 disposed therein, or may have a hollow center with the magnet 340 disposed therein. The wing portions 360 may be disposed to be offset from the inner surface 330a in the axial direction and extend from the cylindrical body 330b in the outward radial direction. The wing portions 360 may not be visible from the outside when the coupling structure 300 is mounted on the shaft 350a.

Coupling structure 200 may also include wing portions similar to those described above for coupling structure 300, and may be mounted to the shaft 22 in a manner similar to that described above with respect to coupling structure 300. That is, coupling structure 200 and coupling structure 300 may have a similar structure.

Figure 8:
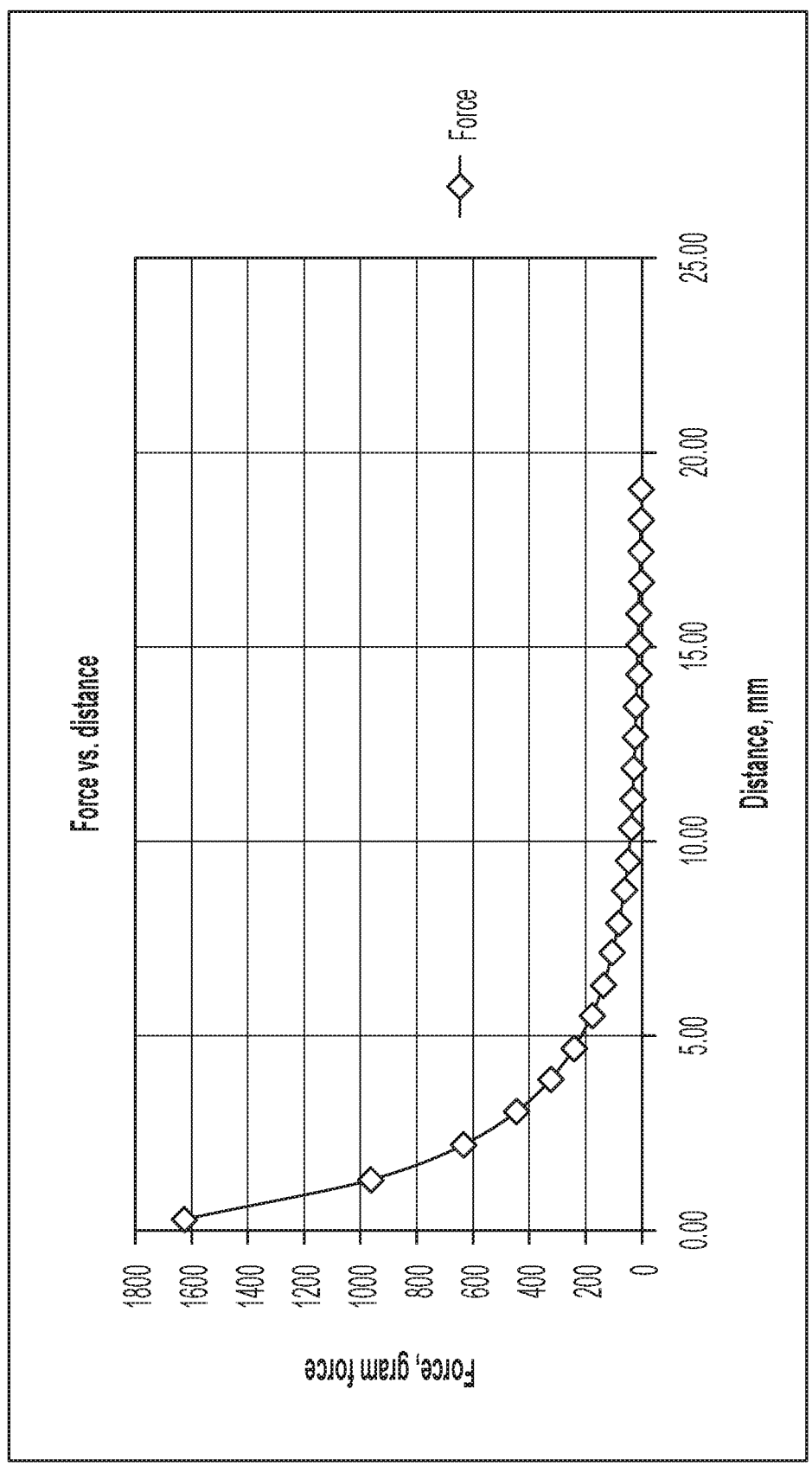
FIG. 8 is an example graphical depiction of a magnitude of a magnetic force with respect to a distance between magnets of the coupling structures, according to an example of the disclosure.

Referring now to FIG. 8, a graphical depiction of a magnitude of a magnetic force with respect to a distance between magnets of the coupling structures is illustrated, according to an example of the disclosure.

In the example of FIG. 8, the graph depicts a relationship between a magnitude of a magnetic force between magnets 240, 340 of the coupling structures 200, 300 of the developing roller 22 and print engine, and a distance between magnets 240, 340 of the coupling structures 200, 300.

For example, when a distance dl (see FIG. 4B) between magnets 240, 340 of the coupling structures 200, 300 is greater than 10 mm, the magnetic force is nearly zero. As the distance dl between magnets 240, 340 of the coupling structures is reduced, the magnetic force increases in a non-linear manner. For example, the magnetic force is inversely proportional to the distance squared ($F \propto 1/r^2$ where F is the magnetic force and r is the distance between the magnets).

The magnetic force between magnets 240, 340 of the coupling structures 200, 300 may be utilized to align the shaft 22a of the developing roller 22 with the shaft 350a of the coupler 350 so that the interlocking drive elements 210, 310 may engage with one another to join the coupling structures 200, 300 so that the coupler 350 may drive rotation of the developing roller 22 for image forming operations such as printing.

In an example, a diameter of the magnet may be about one-fourth the diameter of the coupling structure. For example, the diameter of the magnet may be about one-fourth of an inch, and the diameter of the coupling structure may about one inch. However, the disclosure is not so limited and the magnet may be a different size or have a different proportion relative to the coupling structure.

For example, the interlocking drive elements 210, 310 may be brought into contact with each other head-on (i.e., tooth-to-tooth where axial faces of the interlocking drive elements 210, 310 are brought into contact with each other). Self-alignment may be achieved by rotation of the shaft 22a and/or the shaft 350a in combination with the magnetic force of the magnets 240, 340 which causes the coupling structures 200, 300 to be brought closer to one another by the attraction of the magnets 240, 340 with one another. Therefore, the shafts 22a and 350a may become aligned with one another and the interlocking drive elements 210, 310 are no longer in contact with each other head-on, and instead interlock with one another, for example, as shown in FIGS. 4A-4B.

For example, when the developing roller 22 is mounted to the image forming apparatus, the shaft 22a may be misaligned with the shaft 350a. Self-alignment between the shaft 22a and shaft 350a may be achieved by the magnetic force of the magnets 240, 340 which causes the coupling structures 200, 300 to be brought closer to one another by the attraction of the magnets 240, 340 with one another, so that the shafts 22a and 350a are aligned with one another, and the interlocking drive elements 210, 310 interlock with one another, for example, as shown in FIGS. 4A-4B.

Figure 9A:
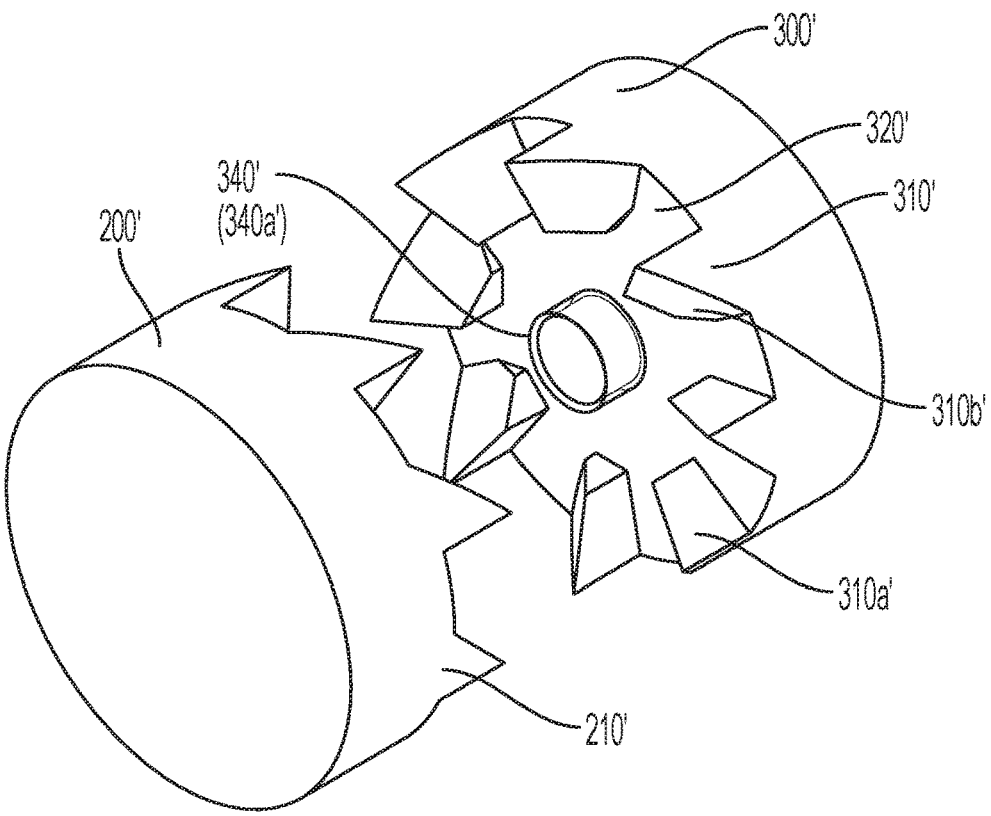
FIGS. 9A-9B illustrate example coupling structures of the developing roller and print engine in perspective views, according to an example of the disclosure.
Figure 9B:
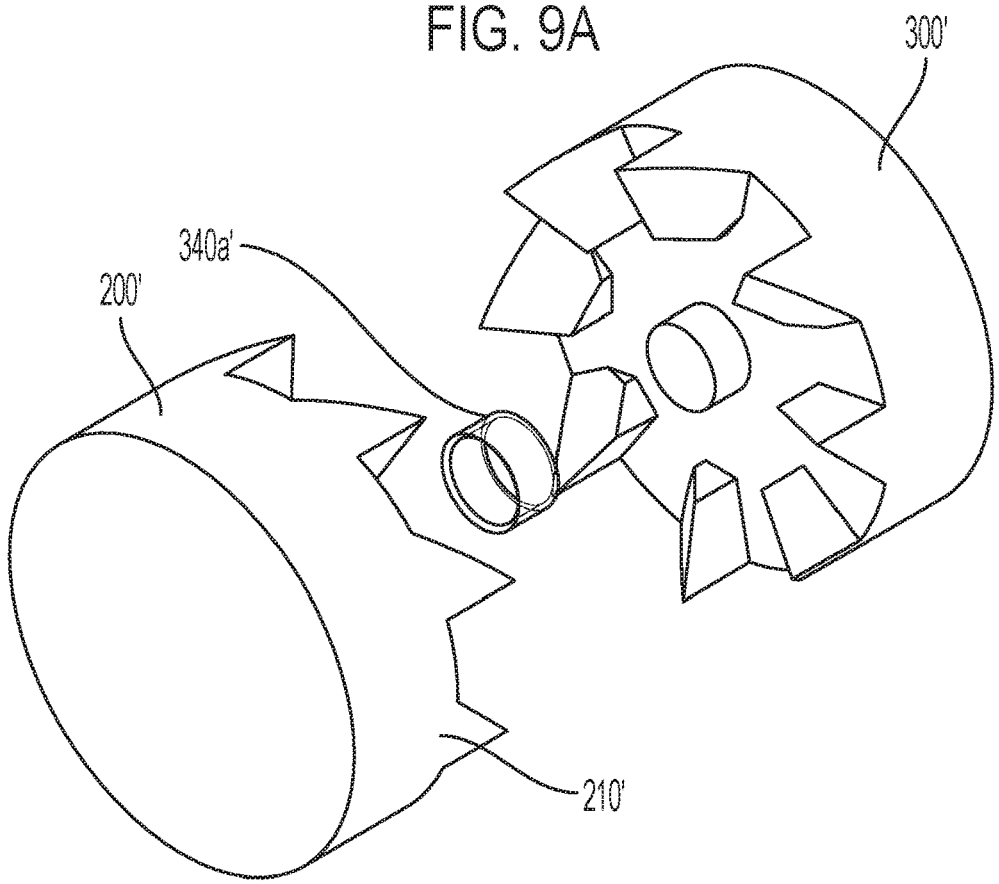

Referring to FIGS. 9A-9B, example coupling structures of the developing roller and print engine are illustrated in perspective views, according to an example of the disclosure.

In the example, a coupling structure 300' is illustrated. The coupling structure 300' may be disposed at an end of a shaft of a coupler of the print engine, similar to the coupler 350 and shaft 350a described above. As another example, the coupling structure 300' may be integrally provided at an end of the shaft or fixed to the end of the shaft by other methods, for example, via an adhesive, or a fixing member such as a screw.

Coupling structure 300' is connectable or coupleable to the coupling structure 200' of the developing roller 22. An interlocking drive element or member 310' (for example, a drive tooth), which protrudes outward in the axial direction, is disposed at an outer portion of surface 320' which faces toward coupler 200'. The interlocking drive element 310' interlocks with a corresponding interlocking drive element 210' of the coupling structure 200' which has a complementary shape with respect to the interlocking drive element 310'. The interlocking drive element 310' may be disposed at various locations of the outer portion of surface 320', for example, at eight circumferentially spaced apart locations. However, the number of interlocking drive elements 310' disposed at the outer portion of surface 320' may be more than eight or less than eight and is not limited to the example. Though the coupling structure 300' is illustrated as having a solid portion from which the interlocking drive elements 310' extend, the coupling structure 300' may include concentric rings or portions including an outer ring and an inner ring similar to the coupling structure 300.

The coupling structure 200' of the developing roller and the coupling structure 300' of the print engine each may include a magnet so that a magnetic attraction occurs between the coupling structure 200' and the coupling structure 300' of the print engine so that the developing roller 22 is properly aligned with the coupler of the print engine, for example when the developing roller 22 is inserted into the image forming apparatus, or when the developing roller 22 is moved from an alienated state back to a non-alienated state.

The magnet 340' of the coupling structure 300' may be disposed in a central portion of a body of the coupling structure 300'. The magnet 340' may be centered in the body, however the magnet 340' need not necessarily be centered. The magnet 340' may be circular in shape and may be disposed to be flush with, recessed, or protruding, with respect to the surface 320'. Magnet 340' may also be mounted in a counterbore from a back side of the body of the coupling structure 300' such that the magnet 340' is just under the surface 320', but still exerts a sufficient magnetic force to hold the coupling together between coupling structures 200', 300'. As another example, the magnet 340' may instead be a ferromagnetic material which is attracted to the magnet of the coupling structure 200'.

Also, shown in FIGS. 9A-9B is a protective cover 340a' which may be fitted over the magnet 340' to cover the magnet 340'. The magnet (not shown) of the coupling structure 200' may be similar to magnet 340' and also may include a protective cover.

In FIGS. 9A-9B, the interlocking drive elements 310' have one side 310a' (a first side) which is vertical (perpendicular) with respect to surface 320' and faces in a first circumferential direction. The interlocking drive elements 310' also have another side 310b' (a second side) which is inclined with respect to surface 320' and faces in a second circumferential direction. The interlocking drive elements 310' may interlock with a corresponding interlocking drive element 210' of the coupling structure 200.

Figure 10:
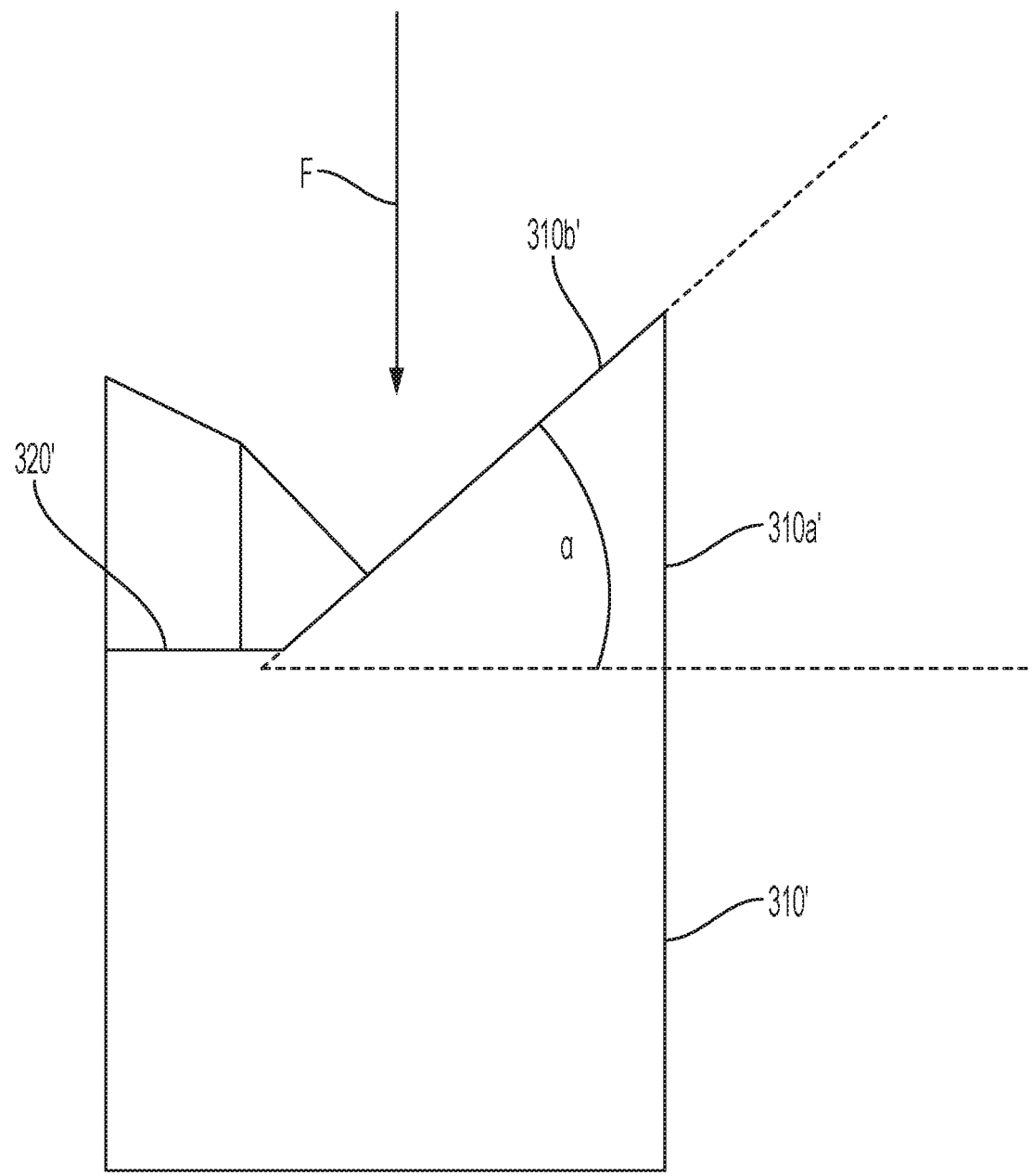
FIG. 10 illustrates an enlarged view of a portion of an example interlocking drive element of the coupling structure, according to an example of the disclosure.

Referring to FIG. 10, an enlarged view of a portion of an example interlocking drive element of the coupling structure is illustrated, according to an example of the disclosure.

The angle of the inclined side face 310b' may be referred to as a pressure angle. For example, the pressure angle α may be set to 45 degrees. However, the disclosure is not so limited and the pressure angle α may be in the range of 20 to 70 degrees, for example. The magnetic force F is also illustrated and is perpendicular to surface 320' of the coupling structure 300'.

As discussed above, the pressure angle of the interlocking drive element 310' may be configured so that when an over-torque condition or side load is encountered, disengagement between the coupling structures 200', 300' occurs and damage to the developing roller, driving source, print engine, or other components of the image forming apparatus is prevented, limited, or avoided.

Referring to FIGS. 11A-11D, an example operation of the coupling structures is illustrated, according to an example of the disclosure.

Figure 11A:
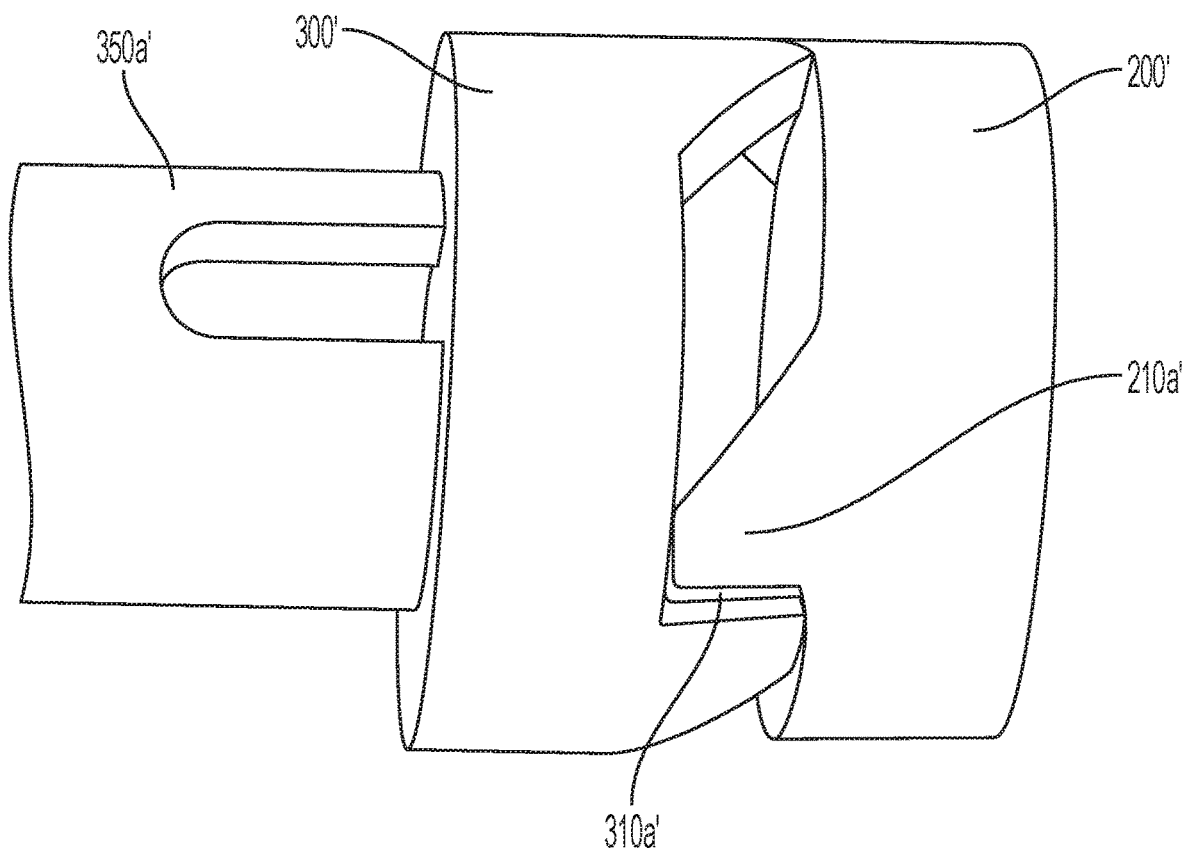
FIGS. 11A-11D illustrate an example operation of the coupling structures, according to an example of the disclosure.

FIG. 11A illustrates a first state in which the coupling structure 200' and coupling structure 300' are coupled via interlocking drive elements 210', 310'.

According to an example, when the developing roller (not shown in FIGS. 11A-11D) is rotated in a first direction, for example a direction used for an image forming operation, the coupling structures 200', 300' may be engaged with one another as shown in FIG. 11A such that vertical sides 210a', 310a' are in contact with each other.

Figure 11B:
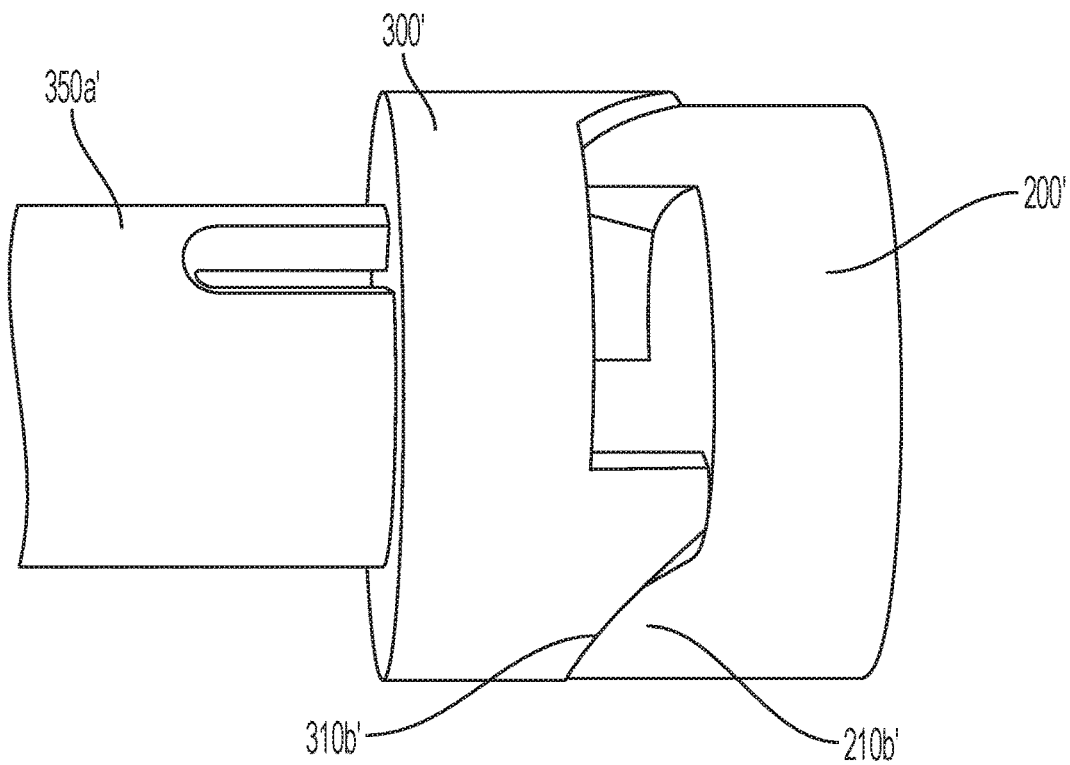
Figure 11C:
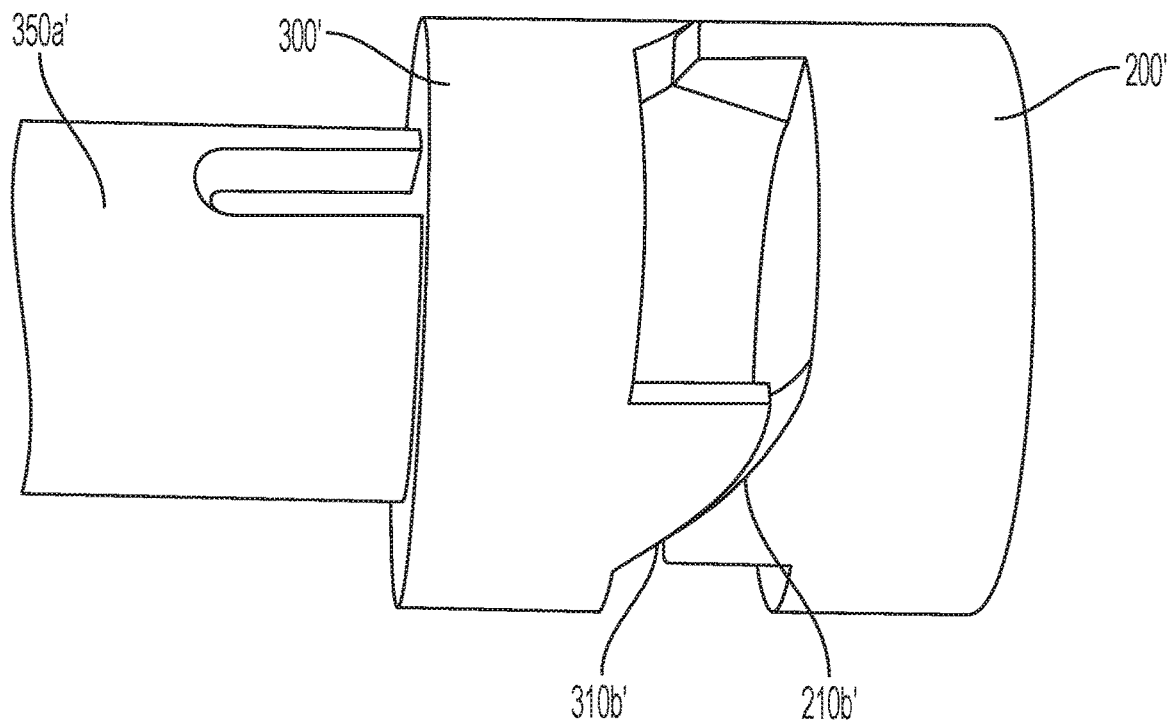
Figure 11D:
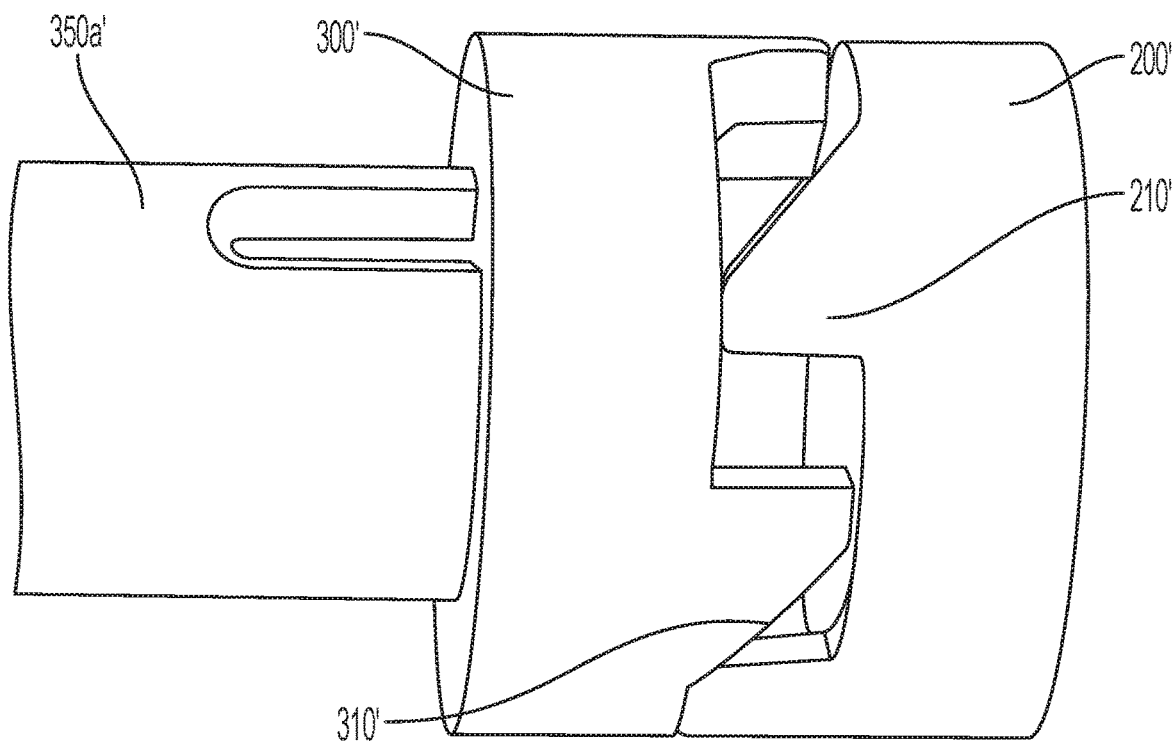

FIG. 11B illustrates a second state in which the developing roller (omitted from FIGS. 11A-11D for ease of illustration) is rotated in a second direction, for example a direction opposite to the first direction, and the coupling structures 200', 300' may become disengaged with one another as shown in FIGS. 11B-11D. For example, as shown in FIG. 11B when the developing roller is rotated in the second direction, a surface 210b' of interlocking drive element 210' comes into contact with surface 310b' of interlocking drive element 310. For example, as shown in FIGS. 11C-11D, surface 210b' of interlocking drive element 210' slides or moves along surface 310b' of interlocking drive element 310' until interlocking drive element 210' slips or slides past an end or tip of the interlocking drive element 310' and coupling structures 200', 300' may be separated from each other.

Figure 12A:
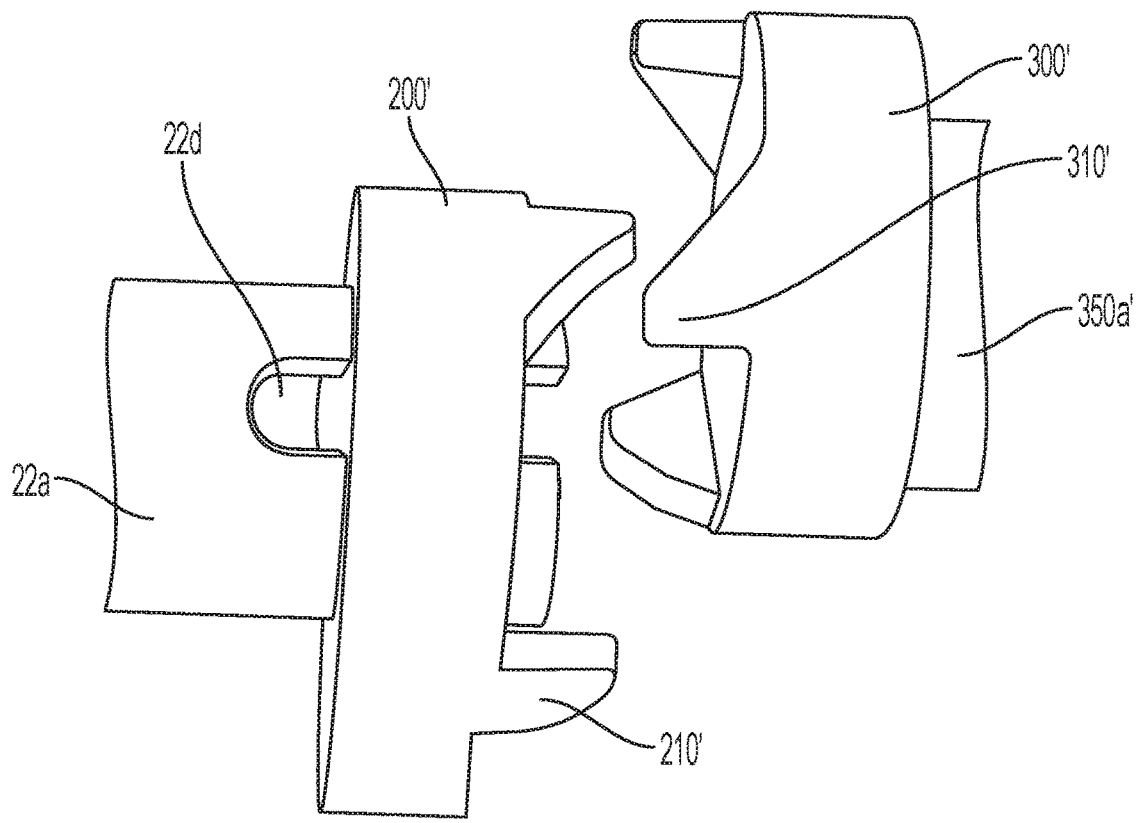
FIGS. 12A-12B illustrate an example operation of the coupling structures, according to an example of the disclosure.
Figure 12B:
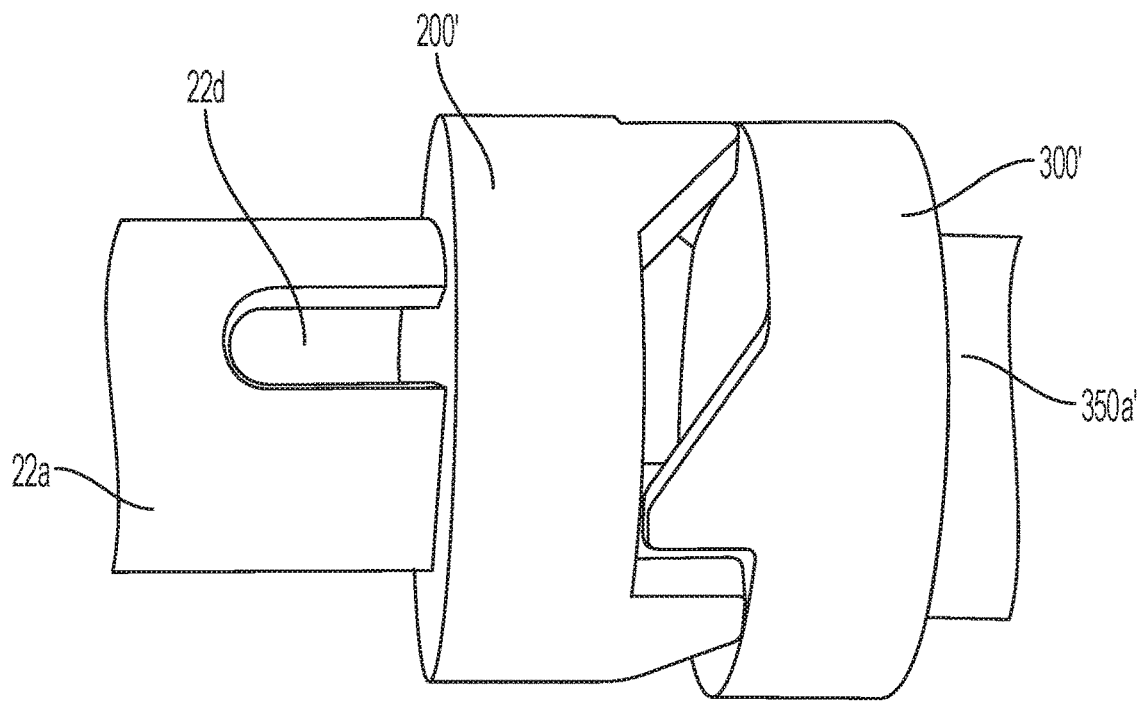

Referring to FIGS. 12A-12B, an example operation of the coupling structures is illustrated, according to an example of the disclosure.

FIG. 12A illustrates a first state in which the coupling structure 200' and coupling structure 300' are disengaged from each other and the developing roller 22 (not shown in the drawing) is an alienated state. The coupling structure 200' is also located at a first position with respect to slot 22d of the shaft 22a. For example, the coupling structure 200' may be located at a part of the slot 22d which is between ends of the slot 22d.

FIG. 12B illustrates a second state in which the developing roller 22 and coupling structure 200' are moved (for example, rotated) from the alienated state to the non-alienated state. During movement of the developing roller 22 and coupling structure 200', to align the coupling structure 200' with coupling structure 300', for example, to align the shaft 22a with shaft 350a', magnets of the coupling structures 200', 300' are attracted to one another such that the interlocking drive elements 210', 310, of the coupling structures 200', 300' become engaged with each other. Additionally, as can be seen from a comparison of FIG. 12A with FIG. 12B, coupling structure 200' is moved from the first position to a second position with respect to slot 22d of the shaft 22a. For example, the coupling structure 200' may be moved in an axial direction toward coupling structure 300' to be located at a part of the slot 22d which is closer to an end of the slot 22d compared to the first position.

Various structures may be utilized or employed to move the developing roller 22 between the alienated and non-alienated states. The developing roller 22, for example an end of shaft 22a which is opposite of the end to which the coupling structure is disposed, may be connected directly or indirectly to a receiving member or coupling member (not shown) which is capable of moving, for example rotating, the developing roller 22 between the alienated and non-alienated states. The receiving member or coupling member may include a gear, a lever, combinations thereof, and the like, which may be driven by a driving source. For example, the developing roller 22 may move between the alienated state and the non-alienated state according to the operation of the image forming apparatus so as to save wear on the developing roller 22 and increase a useful life of the developing roller 22. For example, the developing roller 22 may move to the alienated state, in which the developing roller 22 is not rotated even though the coupler 350 may rotate, when image forming operations are not performed.

Features of the various coupling structures described herein may be combined in any combination thereof and are not mutually exclusive from one another. Additionally, while various examples have described that both the coupling structure of the developing roller and the coupling structure of the coupling of the print engine include a magnet, the disclosure is not so limited. For example, one of the coupling structures may include a magnet, while the other coupling structure may include a magnetic material attracted to the magnet, for example, ferromagnetic materials such as iron, nickel, cobalt, alloys thereof such as steel, and the like.

Various examples have described a first coupling structure of the developing roller includes a magnet disposed in a central portion of a body of the first coupling structure, and a second coupling structure of the print engine includes a magnet disposed in a central portion of a body of the second coupling structure. However, the disclosure is not so limited.

For example, a plurality of magnets may be disposed at various locations of the body of a coupling structure other than the central portion.

The coupling structures described herein may be applied in the context of a developing roller for a development cartridge to be installed in an image forming apparatus, for example, an image forming apparatus having multiple development cartridges such as that illustrated in FIG. 1. However, the disclosure is not so limited and the coupling structures described herein may also be applied in the context of a developing roller for a development cartridge to be installed in an image forming apparatus, for example, an image forming apparatus having a single development cartridge.

Figure 13A:
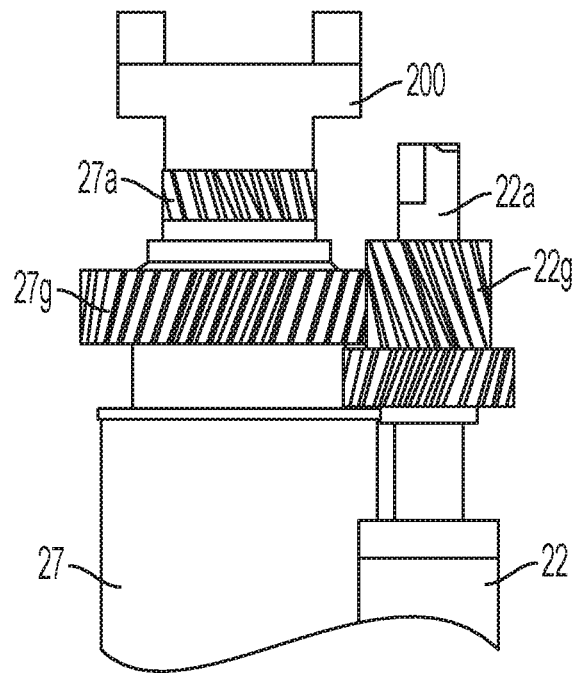
FIGS. 13A-13B illustrate examples of applying a coupling structure to coupling devices of an image forming apparatus, according to examples of the disclosure.
Figure 13B:
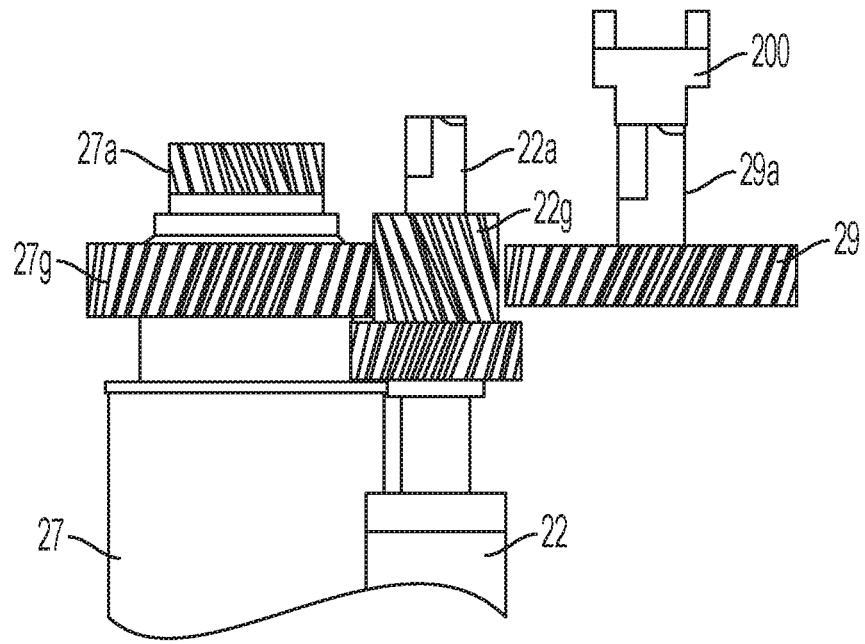

The coupling structures described herein may be applied in the context of coupling devices other than the developing roller. For example, the coupling structure may be applied to the supply roller 27 or a gear, which rotate the developing roller. Referring to FIGS. 13A-13B, examples of applying a coupling structure to coupling devices of an image forming apparatus are illustrated according to examples of the disclosure.

For example, with reference to FIG. 13A, coupling structure 200 may be applied or fixed to an end part of shaft 27a of the supply roller 27. The supply roller 27 may act as or correspond to a coupler (first coupler) having a coupling structure configured to rotate the developing roller 22. The supply roller 27 may be interlocked or coupled with developing roller 22 via a gear mechanism, for example via a gear train or via a gear. For example, gear 27g of the supply roller 27 may be interlocked with gear 22g of the developing roller 22. When the coupling structure 200 is engaged with the another coupling structure of the print engine drive system (e.g., coupling structure 300), the coupling structure 200 may be rotated via the another coupling structure, thereby causing the gear 27g to rotate, and causing the developing roller 22 to rotate via the coupling between gears 27g and 22g. The coupling structure 200 and another coupling structure 300, may instead be coupling structures 200' and 300', respectively, in another example.

For example, with reference to FIG. 13B, coupling structure 200 may be applied or fixed to an end part of shaft 29a of gear 29. The gear 29 may act as or correspond to a coupler (first coupler) having a coupling structure configured to rotate the developing roller 22. The gear 29 may be interlocked or coupled with developing roller 22 via a gear mechanism, for example via a gear train or via a gear. For example, gear 29 may be interlocked with gear 22g of the developing roller 22. When the coupling structure 200 is engaged with the another coupling structure of the print engine drive system (e.g., coupling structure 300), the coupling structure 200 may be rotated via the another coupling structure, thereby causing the gear 29 to rotate, and causing the developing roller 22 to rotate via the coupling between gears 29 and 22g. The coupling structure 200 and another coupling structure 300, may instead be coupling structures 200' and 300', respectively, in another example.

A robust way to couple two shafts together and transmit torque and/or power across a joint is provided according to the example coupling structures described herein. In the clutch configuration the coupling structures may connect shafts while limiting the torque that can be transmitted across the shafts. According to other examples, if a translational force is applied perpendicular to the coupling structure, or if an oblique force is applied to the coupling structure and has a component force in a direction perpendicular to the coupling structure, the coupling structure may detach and be disengaged from the other coupling structure so as to prevent torque transfer. The coupling structures described herein include self-aligning features to allow the coupling structures to properly orient during mounting of the developing roller and/or during movement of the coupling structure from the alienated state to the non-alienated state.

As set forth above in the described examples, an urging member such as a spring is not utilized or needed to keep the coupling structures of the developing roller and the coupler in the aligned state after or during installation of the development cartridge. Therefore, cost savings and a simplified structure may be achieved according to the above-described examples.

While this disclosure has been shown and described with reference to examples thereof, it will be understood by one of ordinary skill in the art that various changes in form and details may be made therein without departing from the spirit and scope as defined by the appended claims.

What is claimed is:

1. A coupler for an image forming apparatus, comprising:
   a shaft; and
   a coupling structure to rotate a developing roller of the image forming apparatus, disposed on an end part of the shaft, movable along an axial direction of the shaft and coupleable with another coupling structure of a print engine of the image forming apparatus, the coupling structure including:
   a body,
   a magnet disposed in the body to cause the coupling structure to be attracted to the another coupling structure to align the coupling structure with the another coupling structure, and
   a plurality of protrusions which protrude from the body in the axial direction to engage with the another coupling structure.

2. The coupler of claim 1, wherein the shaft includes slots along which the coupling structure is slidable according to a magnetic attraction between the coupling structure and the another coupling structure.

3. The coupler of claim 1, wherein
   the body includes an outer portion which circumferentially surrounds an outer surface of the shaft and from which the plurality of protrusions protrude, and
   the body includes an inner portion which is circumferentially surrounded by an inner surface of the shaft and in which the magnet is disposed.

4. The coupler of claim 3, wherein
   the shaft includes slots along which the coupling structure is slidable,
   the body includes a plurality of wing portions which extend radially from the inner portion to the outer portion, and which are inserted in the slots.

5. The coupler of claim 1, wherein
   the body includes a surface which faces away from the end part of the shaft, and
   the magnet is disposed in the body such that the magnet is recessed with respect to the surface or protrudes from the surface.

6. The coupler of claim 1, wherein
   the body includes a surface which is perpendicular to the axial direction and faces away from the end part of the shaft,
   the plurality of protrusions have a first side which faces in a first circumferential direction of the shaft and which is inclined with respect to the surface, and
   the plurality of protrusions have a second side which faces in a second circumferential direction of the shaft and which is inclined with respect to the surface or which is perpendicular with respect to the surface.

7. The coupler of claim 1, wherein the coupling structure further includes a protective cover to cover the magnet.

8. The coupler of claim 1, wherein the plurality of protrusions have at least one side which is inclined.

9. A development cartridge for an image forming apparatus, comprising:
a photoconductor; and
a developing roller, to supply a printing material to the photoconductor and movable between an alienated state in which the developing roller is spaced apart from the photoconductor and a non-alienated state in which the developing roller is in contact with the photoconductor, the developing roller including:
a roller body,
a shaft to pass through the roller body, and
a coupling structure, disposed on an end part of the shaft, the coupling structure including:
a body,
a magnet disposed in the body to cause the coupling structure to move along an axial direction of the shaft when the developing roller is moved from the alienated state to the non-alienated state to align the coupling structure with another coupling structure of a print engine of the image forming apparatus, and
a plurality of protrusions which protrude from the body in the axial direction to engage with the another coupling structure when the developing roller is moved from the alienated state to the non-alienated state.

10. The development cartridge of claim 9, wherein the shaft includes slots along which the coupling structure is slidable according to a magnetic attraction between the coupling structure and the another coupling structure.

11. The development cartridge of claim 9, wherein
the body includes a surface which is perpendicular to the axial direction and faces away from the end part of the shaft,
the plurality of protrusions have a first side which faces in a first circumferential direction of the shaft and which is inclined with respect to the surface, and
the plurality of protrusions have a second side which faces in a second circumferential direction of the shaft and which is inclined with respect to the surface or which is perpendicular to the surface.

12. The development cartridge of claim 9, wherein
the body includes a surface which faces away from the end part of the shaft, and
the magnet is disposed in the body such that the magnet is recessed with respect to the surface or protrudes from the surface.

13. The development cartridge of claim 9, wherein the plurality of protrusions have at least one side which is inclined.

14. An image forming apparatus, comprising:
a main body;
a development cartridge installable to the main body and detachable from the main body, the development cartridge including:
a photoconductor, and
a developing roller, to supply a printing material to the photoconductor;
a first coupler, including:
a first shaft, and
a first coupling structure disposed on an end part of the first shaft, the first coupling structure including:
a first body,
a first magnet disposed in the first body, and
a first plurality of protrusions which protrude from the first body in an axial direction; and
a second coupler fixed to the main body to rotate the developing roller via the first coupling structure, the second coupler including:
a second shaft which protrudes from the second coupler, and
a second coupling structure disposed on an end part of the second shaft, the second coupling structure including:
a second body,
a second magnet or ferromagnetic material disposed in the second body magnetically attractable to the first magnet to align the first coupling structure with the second coupling structure, and
a second plurality of protrusions which protrude from the second body in the axial direction to engage with the first plurality of protrusions.

15. The image forming apparatus of claim 14, wherein the first plurality of protrusions are complementary in shape to the second plurality of protrusions.

16. The image forming apparatus of claim 14, wherein
the developing roller includes a roller body and the first shaft of the first coupler passes through the roller body and is a shaft of the developing roller,
the developing roller is movable between an alienated state in which the developing roller is spaced apart from the photoconductor, and a non-alienated state in which the developing roller is brought into contact with the photoconductor to perform an image forming operation, and
when the developing roller is moved from the alienated state to the non-alienated state, the first magnet is magnetically attractable with the second magnet or ferromagnetic material to cause the first shaft to be aligned with the second shaft.

17. The image forming apparatus of claim 14, wherein
the first body includes a first surface which is perpendicular to the axial direction and faces away from the end part of the first shaft,
the first plurality of protrusions have a first side which faces in a first circumferential direction of the first shaft and which is inclined with respect to the first surface, and a second side which faces in a second circumferential direction of the first shaft and which is perpendicular to the first surface,
the second body includes a second surface which is perpendicular to the axial direction and faces away from the end part of the second shaft,
the second plurality of protrusions have a first side which faces in the second circumferential direction of the first shaft and which is inclined with respect to the second surface, and a second side which faces in the first circumferential direction of the first shaft and which is perpendicular to the second surface,
when the second side of the first plurality of protrusions is engaged with the second side of the second plurality of protrusions, the developing roller is rotatable in a first direction, and
when a rotational force is applied to the first coupler in a second direction, the first side of the first plurality of protrusions is to engage with and slide along the first side of the second plurality of protrusions, to disengage the first coupling structure from the second coupling structure.

18. The image forming apparatus of claim 14, wherein the first plurality of protrusions have at least one side which is inclined, and the second plurality of protrusions have at least one side which is inclined.

\* \* \* \* \*